(12) United States Patent
Bol

(10) Patent No.: US 12,409,496 B2
(45) Date of Patent: Sep. 9, 2025

(54) PRE-HEATING METHODS FOR PERFORMING ELECTRON BEAM POWDER BED FUSION

(71) Applicant: The Boeing Company, Chicago, IL (US)

(72) Inventor: Eric David Bol, Snohomish, WA (US)

(73) Assignee: The Boeing Company, Arlington, VA (US)

( * ) Notice: Subject to any disclaimer, the term of this patent is extended or adjusted under 35 U.S.C. 154(b) by 695 days.

(21) Appl. No.: 17/730,667

(22) Filed: Apr. 27, 2022

(65) Prior Publication Data

US 2023/0347414 A1    Nov. 2, 2023

(51) Int. Cl.
*B22F 10/362* (2021.01)
*B22F 1/05* (2022.01)
(Continued)

(52) U.S. Cl.
CPC .............. *B22F 10/362* (2021.01); *B22F 1/05* (2022.01); *B22F 10/28* (2021.01); *B22F 12/30* (2021.01);
(Continued)

(58) Field of Classification Search
CPC ........ B22F 10/362; B22F 12/45; B22F 12/41; B22F 12/30; B22F 10/28; B22F 1/05;
(Continued)

(56) References Cited

U.S. PATENT DOCUMENTS 3,600,272 A    8/1971    Cortigene et al.
3,813,976 A    6/1974    Greer
(Continued)

FOREIGN PATENT DOCUMENTS

CN    103817937 A    5/2014
CN    105209240 A    12/2015
(Continued)

OTHER PUBLICATIONS

Machine-generated English language translation of CN103817937A, downloaded from Espacenet Aug. 25, 2021.
(Continued)

*Primary Examiner* — Steven W Crabb
*Assistant Examiner* — Dilnessa B Belay
(74) *Attorney, Agent, or Firm* — Kolitch Romano Dascenzo Gates LLC

(57) ABSTRACT

Electron beam powder bed fusion may be performed using waste powder from laser beam powder bed fusion by pre-heating a build chamber using stepped increases of electron beam current. To perform the pre-heating without smoking the powder, a plurality of predetermined interim temperatures, ranging from an ambient, resting temperature of the build chamber to a predetermined preheated temperature, are determined. A build plate within the build chamber is exposed to a plurality of streams of electrons, one at a time, while the build plate is surrounded by the waste powder. Each stream of electrons has a progressively increasing current, with the current being increased each time an actual temperature of the build chamber reaches or exceeds the next predetermined interim temperature. The actual temperature of the build chamber is monitored during the pre-heating, to compare the actual temperature of the build chamber to the plurality of predetermined interim temperatures.

20 Claims, 7 Drawing Sheets

(51) Int. Cl.
  *B22F 10/28* (2021.01)
  *B22F 12/30* (2021.01)
  *B22F 12/41* (2021.01)
  *B22F 12/45* (2021.01)
  *B33Y 10/00* (2015.01)
  *B33Y 40/10* (2020.01)
  *B33Y 70/00* (2020.01)

(52) U.S. Cl.
  CPC .............. *B22F 12/41* (2021.01); *B22F 12/45* (2021.01); *B33Y 10/00* (2014.12); *B33Y 40/10* (2020.01); *B33Y 70/00* (2014.12); *B22F 2203/11* (2013.01); *B22F 2301/205* (2013.01); *B22F 2304/10* (2013.01)

(58) Field of Classification Search
  CPC ............ B22F 2203/11; B22F 2301/205; B22F 2304/10; B33Y 10/00; B33Y 70/00; B33Y 40/10
  USPC .................................................... 219/121.35
  See application file for complete search history.

(56) References Cited

U.S. PATENT DOCUMENTS

| | | | |
|---|---|---|---|
| 3,873,399 | A | 3/1975 | Goldsworthy et al. |
| 3,993,726 | A | 11/1976 | Moyer |
| 4,154,634 | A | 5/1979 | Shobert et al. |
| 4,378,343 | A | 3/1983 | Sugiura et al. |
| 4,435,246 | A | 3/1984 | Green |
| 4,462,946 | A | 7/1984 | Goldsworthy |
| 4,799,985 | A | 1/1989 | McMahon et al. |
| 4,929,402 | A | 5/1990 | Hull |
| 4,943,472 | A | 7/1990 | Dyksterhouse et al. |
| 4,973,503 | A | 11/1990 | Hotchkiss |
| 5,164,569 | A | 11/1992 | Porra et al. |
| 5,204,124 | A | 4/1993 | Secretan et al. |
| 5,294,461 | A | 3/1994 | Ishida |
| 5,340,433 | A | 8/1994 | Crump |
| 5,398,193 | A | 3/1995 | deAngelis |
| 5,495,328 | A | 2/1996 | Spence et al. |
| 5,503,785 | A | 4/1996 | Crump et al. |
| 5,914,080 | A | 6/1999 | Gauchel et al. |
| 5,936,861 | A | 8/1999 | Jang et al. |
| 6,129,872 | A | 10/2000 | Jang |
| 6,149,856 | A | 11/2000 | Zemel et al. |
| 6,214,279 | B1 | 4/2001 | Yang et al. |
| 6,395,210 | B1 | 5/2002 | Head et al. |
| 6,495,091 | B1 | 12/2002 | Manson et al. |
| 6,500,370 | B1 | 12/2002 | Belvin et al. |
| 6,537,052 | B1 | 3/2003 | Adler |
| 6,722,872 | B1 | 4/2004 | Swanson et al. |
| 6,899,777 | B2 | 5/2005 | Vaidyanathan et al. |
| 7,114,943 | B1 | 10/2006 | Fong et al. |
| 7,232,850 | B2 | 6/2007 | Johnson et al. |
| 7,329,379 | B2 | 2/2008 | Boyd et al. |
| 7,521,105 | B2 | 4/2009 | Bech et al. |
| 7,681,615 | B2 | 3/2010 | McCowin |
| 7,744,801 | B2 | 6/2010 | Owada |
| 7,879,177 | B2 | 2/2011 | McCowin et al. |
| 7,891,964 | B2 | 2/2011 | Skubic et al. |
| 7,942,987 | B2 | 5/2011 | Crump et al. |
| 7,960,024 | B2 | 6/2011 | Nair et al. |
| 8,110,135 | B2 | 2/2012 | El-Siblani |
| 8,133,537 | B2 | 3/2012 | Nair et al. |
| 8,151,854 | B2 | 4/2012 | Oldani |
| 8,187,521 | B2 | 5/2012 | Larsson et al. |
| 8,691,037 | B2 | 4/2014 | Ingram, Jr. et al. |
| 8,801,990 | B2 | 8/2014 | Mikulak et al. |
| 8,920,697 | B2 | 12/2014 | Mikulak et al. |
| 9,096,000 | B2 | 8/2015 | Maliszewski et al. |
| 9,102,098 | B2 | 8/2015 | Dilworth et al. |
| 9,102,099 | B1 | 8/2015 | Karpas et al. |
| 9,126,367 | B1 | 9/2015 | Mark et al. |
| 9,132,587 | B2 | 9/2015 | Eshed et al. |
| 9,138,940 | B2 | 9/2015 | Post et al. |
| 9,149,988 | B2 | 10/2015 | Mark et al. |
| 9,149,989 | B2 | 10/2015 | Uckelmann |
| 9,511,543 | B2 | 12/2016 | Tyler |
| 9,527,240 | B2 | 12/2016 | Batchelder |
| 9,577,224 | B2 | 2/2017 | Lee et al. |
| 9,586,298 | B2 | 3/2017 | Jones et al. |
| 9,623,437 | B2 | 4/2017 | Tibor et al. |
| 9,650,537 | B2 | 5/2017 | Kunc et al. |
| 9,656,641 | B2 | 5/2017 | Griffith et al. |
| 9,694,544 | B2 | 7/2017 | Mark et al. |
| 9,751,260 | B2 | 9/2017 | Dietrich et al. |
| 9,789,462 | B2 | 10/2017 | Singh |
| 9,815,268 | B2 | 11/2017 | Mark et al. |
| 9,849,019 | B2 | 12/2017 | Miller et al. |
| 10,016,932 | B2 | 7/2018 | Moore et al. |
| 10,039,195 | B2 | 7/2018 | Elmieh et al. |
| 10,137,500 | B2 | 11/2018 | Blackmore |
| 10,155,345 | B2 | 12/2018 | Ermoshkin et al. |
| 10,195,784 | B2 | 2/2019 | Evans et al. |
| 10,201,941 | B2 | 2/2019 | Evans et al. |
| 10,232,550 | B2 | 3/2019 | Evans et al. |
| 10,232,570 | B2 | 3/2019 | Evans et al. |
| 10,293,591 | B2 | 5/2019 | Nielsen-Cole et al. |
| 10,335,856 | B2 | 7/2019 | Swaminathan et al. |
| 10,343,330 | B2 | 7/2019 | Evans et al. |
| 10,343,355 | B2 | 7/2019 | Evans et al. |
| 10,442,118 | B2 | 10/2019 | Grewell |
| 10,457,033 | B2 | 10/2019 | Wilenski et al. |
| 10,766,199 | B2 | 9/2020 | Yoshinari |
| 2001/0048184 | A1 | 12/2001 | Ueno |
| 2002/0017743 | A1 | 2/2002 | Priedeman, Jr. |
| 2004/0119188 | A1 | 6/2004 | Lowe |
| 2005/0023719 | A1 | 2/2005 | Nielsen et al. |
| 2005/0038222 | A1 | 2/2005 | Joshi et al. |
| 2005/0093208 | A1 | 5/2005 | Boyd et al. |
| 2005/0104241 | A1 | 5/2005 | Kritchman et al. |
| 2005/0116391 | A1 | 6/2005 | Lindemann et al. |
| 2006/0048881 | A1 | 3/2006 | Evans et al. |
| 2006/0083907 | A1 | 4/2006 | Bech et al. |
| 2007/0029030 | A1 | 2/2007 | McCowin |
| 2008/0157437 | A1 | 7/2008 | Nelson et al. |
| 2008/0257879 | A1 | 10/2008 | Huskamp |
| 2008/0315462 | A1 | 12/2008 | Batzinger et al. |
| 2011/0195237 | A1 | 8/2011 | Patel et al. |
| 2011/0300301 | A1 | 12/2011 | Fernando et al. |
| 2012/0267345 | A1 | 10/2012 | Clark et al. |
| 2013/0136890 | A1 | 5/2013 | Maliszewski et al. |
| 2014/0141166 | A1 | 5/2014 | Rodgers |
| 2014/0232035 | A1 | 8/2014 | Bheda |
| 2014/0265000 | A1 | 9/2014 | Magnotta et al. |
| 2014/0291886 | A1 | 10/2014 | Mark et al. |
| 2015/0174824 | A1 | 6/2015 | Gifford et al. |
| 2015/0239046 | A1 | 8/2015 | McMahan et al. |
| 2015/0314532 | A1 | 11/2015 | Gordon |
| 2016/0096326 | A1 | 4/2016 | Naware |
| 2016/0114532 | A1 | 4/2016 | Schirtzinger et al. |
| 2016/0136897 | A1 | 5/2016 | Nielsen-Cole et al. |
| 2016/0159009 | A1 | 6/2016 | Canale |
| 2016/0207259 | A1 | 7/2016 | Fruth |
| 2016/0230283 | A1 | 8/2016 | Tseliakhovich et al. |
| 2016/0236299 | A1 | 8/2016 | Oberhofer |
| 2016/0271874 | A1 | 9/2016 | Tsai et al. |
| 2016/0375491 | A1 | 12/2016 | Swaminathan et al. |
| 2017/0014906 | A1 | 1/2017 | Ng et al. |
| 2017/0072633 | A1 | 3/2017 | Hsu |
| 2017/0120538 | A1* | 5/2017 | DeMuth ............... B23K 26/144 |
| 2017/0129179 | A1 | 5/2017 | Mandel et al. |
| 2017/0129180 | A1 | 5/2017 | Coates et al. |
| 2017/0136545 | A1 | 5/2017 | Yoshimura et al. |
| 2017/0157845 | A1 | 6/2017 | Bihari et al. |
| 2017/0157857 | A1* | 6/2017 | Butcher ................... B22F 3/24 |
| 2017/0217100 | A1 | 8/2017 | Gardiner |
| 2017/0235294 | A1 | 8/2017 | Shapiro et al. |
| 2017/0341307 | A1 | 11/2017 | Vilajosana et al. |
| 2018/0029296 | A1 | 2/2018 | Van Esbroeck et al. |
| 2018/0072000 | A1 | 3/2018 | Riemann |
| 2018/0117836 | A1 | 5/2018 | Reese et al. |

(56) References Cited

U.S. PATENT DOCUMENTS

| | | |
|---|---|---|
| 2018/0126671 A1 | 5/2018 | Wilenski et al. |
| 2018/0141284 A1 | 5/2018 | Wilenski et al. |
| 2018/0154588 A1 | 6/2018 | Wilenski et al. |
| 2018/0236714 A1 | 8/2018 | Thelakkadan et al. |
| 2018/0345374 A1 | 12/2018 | Snis |
| 2018/0345597 A1 | 12/2018 | Wilenski et al. |
| 2018/0361660 A1 | 12/2018 | Chen |
| 2019/0009462 A1 | 1/2019 | Wilenski et al. |
| 2019/0009471 A1 | 1/2019 | Wilenski et al. |
| 2019/0054701 A1 | 2/2019 | Yoshinari |
| 2019/0270247 A1 | 9/2019 | Hyatt et al. |
| 2020/0108558 A1 | 4/2020 | Vermeulen et al. |
| 2020/0238566 A1 | 7/2020 | Lin et al. |
| 2021/0237158 A1 | 8/2021 | Pavan et al. |
| 2023/0042159 A1* | 2/2023 | Chern ............... B33Y 40/10 |

FOREIGN PATENT DOCUMENTS

| | | |
|---|---|---|
| CN | 105531062 A | 4/2016 |
| CN | 107812945 A | 3/2018 |
| CN | 111070676 A | 4/2020 |
| CN | 112453426 A | 3/2021 |
| CN | 112276113 B | 4/2021 |
| CN | 112893871 A | 6/2021 |
| CN | 113414411 A | 9/2021 |
| CN | 113580561 A | 11/2021 |
| DE | 102013103973 | 10/2014 |
| DE | 102015002967 | 10/2016 |
| EP | 1151849 A1 | 11/2001 |
| EP | 1494248 A2 | 1/2005 |
| EP | 2583773 A2 | 4/2013 |
| JP | H02130132 | 5/1990 |
| JP | 2015174284 A | 10/2015 |
| WO | WO2001/081031 A1 | 11/2001 |
| WO | WO2006/020685 A2 | 2/2006 |
| WO | WO2008/013483 A1 | 1/2008 |
| WO | WO2012/039956 A1 | 3/2012 |
| WO | WO2013/086577 A1 | 6/2013 |
| WO | WO2013/092994 A1 | 6/2013 |
| WO | WO2014/138386 A1 | 9/2014 |
| WO | WO2014/153535 A2 | 9/2014 |
| WO | WO2015/009938 A1 | 1/2015 |
| WO | WO2015/193819 A2 | 12/2015 |
| WO | WO2016/053681 A1 | 4/2016 |
| WO | WO2016/125138 A2 | 8/2016 |
| WO | WO2016/139059 A1 | 9/2016 |
| WO | WO2016/149181 A1 | 9/2016 |

OTHER PUBLICATIONS

Machine-generated English language translation of CN105209240A, downloaded from Espacenet Aug. 25, 2021.
Machine-generated English translation of CN105531062A, downloaded from Google Patents on Dec. 22, 2020.
Machine-generated English translation of CN107812945A, downloaded from Google Patents on Apr. 26, 2022.
Machine-generated English translation of CN111070676A, downloaded from Google Patents on Apr. 26, 2022.
Machine-generated English translation of CN112276113B, downloaded from Google Patents on Apr. 26, 2022.
Machine-generated English translation of CN112453426A, downloaded from Google Patents on Apr. 26, 2022.
Machine-generated English translation of CN112893871A, downloaded from Google Patents on Apr. 26, 2022.
Machine-generated English translation of CN113414411A, downloaded from Google Patents on Apr. 26, 2022.
Machine-generated English translation of CN113580561A, downloaded from Google Patents on Apr. 26, 2022.
Machine-generated English translation of the abstract for DE102013103973A1 downloaded from Espacenet.com on Nov. 1, 2017.
Machine-generated English translation of the abstract of DE102015002967A1, downloaded from Espacenet.com Jun. 12, 2018.
Machine-generated English translation of the abstract for EP1494248A2 downloaded from Espacenet.com on Nov. 21, 2018.
Machine-generated English translation of the abstract of JP 2015174284A, downloaded from Espacenet.com Jun. 12, 2018.
Machine-generated English translation of the description of JPH02130132, downloaded from Espacenet on Mar. 11, 2020.
Machine-generated English translation of WO2013/092994A1, downloaded from Google Patents on Apr. 26, 2022.
Ogale et al., "Fabrication of Fiber Reinforced Plates with Curvilinear Layout by 3 D Photolithography," 26th International SAMPE Technical Conference, vol. 26, pp. 54-61, Oct. 17-20, 1994.
Renault et al., "Photo Dynamic Mechanical Analysis for Cure Monitoring of Fiber Reinforced Photoresin Composites," Journal of Advanced Materials, vol. 29, No. 1, pp. 42-47, Oct. 12, 1996.
Ogale et al., "3-Dimensional Composite Photolithography," Proceedings of the American Society for Composites, Eleventh Technical Conference, pp. 822-828, Oct. 7-9, 1996.
Gupta et al., "Dual Curing of Carbon Fiber Reinforced Photoresins for Rapid Prototyping," Polymer Composites, vol. 23, No. 6, pp. 1162-1170, Dec. 2002.
Hu et al., "Sensing, Modeling and Control for Laser-Based Additive Manufacturing," International Journal of Machine Tools and Manufacture, No. 43, pp. 51-60, 2003.
Website screenshots showing abstract of Debout et al., "Tool Path Smoothing of a Redundant Machine: Application to Automated Fiber Placement," Computer-Aided Design, vol. 43, Issue 2, pp. 122-132, Feb. 2011, from ScienceDirect.com website, downloaded on Aug. 19, 2015.
Printout of online article "Carbon-Fiber Epoxy Honeycombs Mimic the Material Performance of Balsa Wood," Jun. 27, 2014, downloaded from redorbit.com/news/science/1113180114/carbon-fiber-epoxy-honeycombs-mimic-the-material-performance-of-balsa-wood/, Aug. 19, 2015.
Printout of online article "Carbon3D Introduces Breakthrough CLIP Technology for Layerless 3D Printing, 25-100x Faster," Mar. 17, 2015, from 3Ders.org website, downloaded on Aug. 19, 2015.
Website screenshots showing online article, Krassenstein "Orbital Composites to Make 3D Printing 100 Times Faster Using Carbon Fiber, Fiber Optics, Injection & More," Apr. 28, 2015, from 3DPrint.com website, downloaded on Aug. 19, 2015.
Website screenshots showing "Fiber Composite 3D Printing," from MakeZine.com website, downloaded on Jun. 2, 2015.
Farshidianfar et al., "Real-Time Control of Microstructure in Laser Additive Manufacturing," International Journal of Advanced Manufacturing Technology (2016), vol. 82, pp. 1173-1186, published online Jul. 1, 2015.
Website screenshots showing The Mark One Composite 3D Printer, from MarkForged.com website, downloaded on Aug. 19, 2015.
Printout of online article "Automated Fiber Placement," from AutomatedDynamics.com website, downloaded on Aug. 19, 2015.
Printout of website showing FormLabs, Frequently Asked Questions (re the Form1+ SLA 3D Printer), from FormLabs.com website, downloaded on Aug. 19, 2015.
User Manual for 3Doodler 2.0, from The3Doodler.com website, downloaded on Aug. 19, 2015.
Website screenshots of online how-to article, "Fiber Composite 3D Printing (The Bug)," from Instructables.com website, downloaded on Aug. 20, 2015.
Website screenshots showing The Form 1+ SLA 3D Printer, from FormLabs.com website, downloaded on Aug. 20, 2015.
Printout of online article, Jeff Sloan, "Arevo Labs launches 3D printing platform for composite parts fabrication," Nov. 16, 2015, from CompositesWorld.com website, downloaded on Dec. 9, 2015.
Website screenshots of online article, Evan Milberg, "Arevo Labs Introduces First Robot-Based Platform for 3-D Printing Composite Parts," Nov. 23, 2015, from CompositesManufacturingMagazine.com website, downloaded on Jan. 12, 2016.
Printout of online article, "Improving Additive Manufacturing (3D Printing) using Infrared Imaging," Aug. 10, 2016, from AZoM.com website, downloaded on Nov. 4, 2016.

(56) References Cited

OTHER PUBLICATIONS

Website screenshots showing Stratonics ThermaViz® Sensor Systems, from Stratonics.com website, downloaded on Nov. 4, 2016.

* cited by examiner

PRE-HEATING METHODS FOR PERFORMING ELECTRON BEAM POWDER BED FUSION

FIELD

The present disclosure relates generally to additive manufacturing processes, and more particularly to pre-heating methods for performing electron beam powder bed fusion using waste powder from laser beam powder bed fusion.

BACKGROUND

Additive manufacturing is the process by which three-dimensional parts can be made one layer at a time from a three-dimensional CAD model. Powder bed fusion (PBF) is a type of additive manufacturing process by which a thin layer of powder is distributed across a bed or build plate, and an energy source selectively melts and fuses the powder according to the respective current cross section of the CAD model. After a given cross sectional layer of the model is melted, the bed is lowered a distance equal to the thickness of one layer, and a new layer of powder is spread or rolled on, to continue and repeat the process. Depending on the type of machine being used, powder bed fusion uses either a laser or an electron beam to melt and fuse each layer of material powder together to develop the desired products or parts.

The same machine cannot perform both electron beam and laser beam powder bed fusion. The different types of powder bed fusion machines require different powders for the respective process to work. In other words, powder for laser beam powder bed fusion is not conventionally suitable for use in electron beam powder bed fusion machines. For example, it is well known in the art that the electron beam powder bed fusion (EB-PBF) process typically requires a larger powder size than the laser beam powder bed fusion (LB-PBF) process. This is because EB-PBF is unable to utilize the smaller powder designated for LB-PBF machines due to the adverse effects of electro-static charging of the powder particles. EB-PBF powder (with a typical average particle size of 60 micrometers ($\mu m$)) can be almost double the size of LB-PBF powder (with a typical average particle size of 36 $\mu m$). Attempting to use LB-PBF powder in EB-PBF machines causes the powder to "smoke," due to said electro-static charging during pre-heating. The larger EB-PBF powder is not affected by these electro-static forces due to the force of gravity stabilizing the larger particles. The smaller particles from LB-PBF powder are much more sensitive to charging: they react to the charge by repelling each other and spreading in all directions, resulting in "smoking," which disturbs the powder bed and prevents the additive process from going forward because it destabilizes the build.

Generally, manufacturers of powder bed fusion machines also supply the powder to be used in their machines, so manufacturers of laser beam powder bed fusion (LB-PBF) machines instruct and/or supply the proper powder to use in those LB-PBF machines, and likewise, manufacturers of electron beam powder bed fusion (EB-PBF) machines instruct and/or supply the proper power powder to use in EB-PBF machines. It is well-known in the art to use manufacturer-supplied powder in a given powder bed fusion machine, as doing otherwise would create instability from the start. It is well understood in the art that EB-PBF machines require different sized powders from LB-PBF machines, and one of skill in the art would not expect powder manufactured for one type of machine to work in the other type of machine. Also, the manufacturer-supplied powders are designed for productivity and efficiency, to enable the additive manufacturing process to proceed fast as possible.

In additive manufacturing of metal parts, LB-PBF tends to be the more commonly-used technology, though it often results in waste powder that is leftover once a part is completed and the waste powder cannot be re-used. Typical supply powders for LB-PBF machines have an average particle size of about 30-40 $\mu m$. If particles are too large or clump together, they are deemed unusable or "oversized," and cannot be reused in a LB-PBF machine. This waste powder is considered a hazardous material, and thus disposal must be done with care, and at an additional expense. Furthermore, the cost of the powder is high (about $150 per pound), and thus any waste represents a significant cost in the manufacturing process.

The alternative process, EB-PBF, creates three-dimensional parts by melting metal powder by exposing it to a beam of electrons. The process starts with the spreading of a thin layer of metal powder around a build plate. The powder and the build chamber are pre-heated by exposing the entire layer to a stream of electrons. This broad exposure of electrons serves to heat the powder and the build chamber to an appropriately high temperature, which varies depending on the material of powder being used. When titanium-based powders are used, such as Ti-6Al-4V powder, the powder is typically pre-heated to about 700-800 degrees Celsius (° C.). Other materials may require even higher temperatures. FIG. 1 shows a graph of a typical conventional pre-heating scheme for EB-PBF machines, in which a constant power input is supplied (indicated in dashed line) until the temperature of the build chamber (indicated in solid line) rises to the desired pre-heated temperature.

SUMMARY

The present disclosure concerns methods of pre-heating EB-PBF machines to enable the use of waste powder from LB-PBF machines in EB-PBF machines.

In one disclosed method of performing EB-PBF additive manufacturing, a plurality of predetermined interim temperatures may be determined, ranging from an ambient, resting temperature of a build chamber of an EB-PBF machine to a predetermined preheated temperature. Each subsequent predetermined interim temperature of the plurality of predetermined interim temperatures is greater than each previous predetermined interim temperature of the plurality of predetermined interim temperatures. The method also includes pre-heating the build chamber to, or above, the predetermined preheated temperature, which may involve exposing a build plate within the build chamber to a plurality of streams of electrons, one at a time, while the build plate is surrounded by waste powder that is leftover and obtained from a LB-PBF system. Each stream of electrons of the plurality of streams of electrons may have a different respective current and may be configured to raise an actual temperature of the build chamber. Disclosed methods also may include monitoring the actual temperature of the build chamber while the build plate is exposed to the plurality of streams of electrons and comparing the actual temperature of the build chamber to the plurality of predetermined interim temperatures. A power input of the EB-PBF machine may be increased a plurality of times, each time thereby exposing the build plate to a respective subsequent stream of electrons of the plurality of streams of electrons, such that each subsequent stream of electrons has a greater current level than a previous stream of electrons of the plurality of streams of electrons. The power input may be increased each time the actual temperature of the build chamber reaches or exceeds a respective subsequent predetermined interim temperature of the plurality of predetermined interim temperatures, as determined by comparing the actual temperature to the plurality of predetermined interim temperatures.

In another exemplary method of performing EB-PBF, pre-heating the build chamber to a predetermined preheated temperature, includes exposing a build plate within the build chamber to a first stream of electrons at a first current for a first time period sufficient to pre-heat the build chamber to a predetermined first interim temperature, while the build plate is surrounded by waste powder that is leftover and obtained from a LB-PBF system. The method also may include monitoring an actual temperature of the build chamber to determine when the actual temperature of the build chamber reaches or exceeds the predetermined first interim temperature. The build plate may then be exposed to a second stream of electrons once the actual temperature of the build chamber reaches or exceeds the predetermined first interim temperature, with the second stream of electrons having a second current that is greater than the first current. The build plate may be exposed to the second stream of electrons for a second time period sufficient to pre-heat the build plate to a predetermined second interim temperature that is greater than the predetermined first interim temperature and less than the predetermined preheated temperature. This process may be repeated each time the next predetermined interim temperature is reached or exceeded, until the actual temperature of the build chamber reaches or exceeds the predetermined preheated temperature.

Parts made according to presently disclosed methods are also within the scope of the present disclosure.

DESCRIPTION

Figure 2:
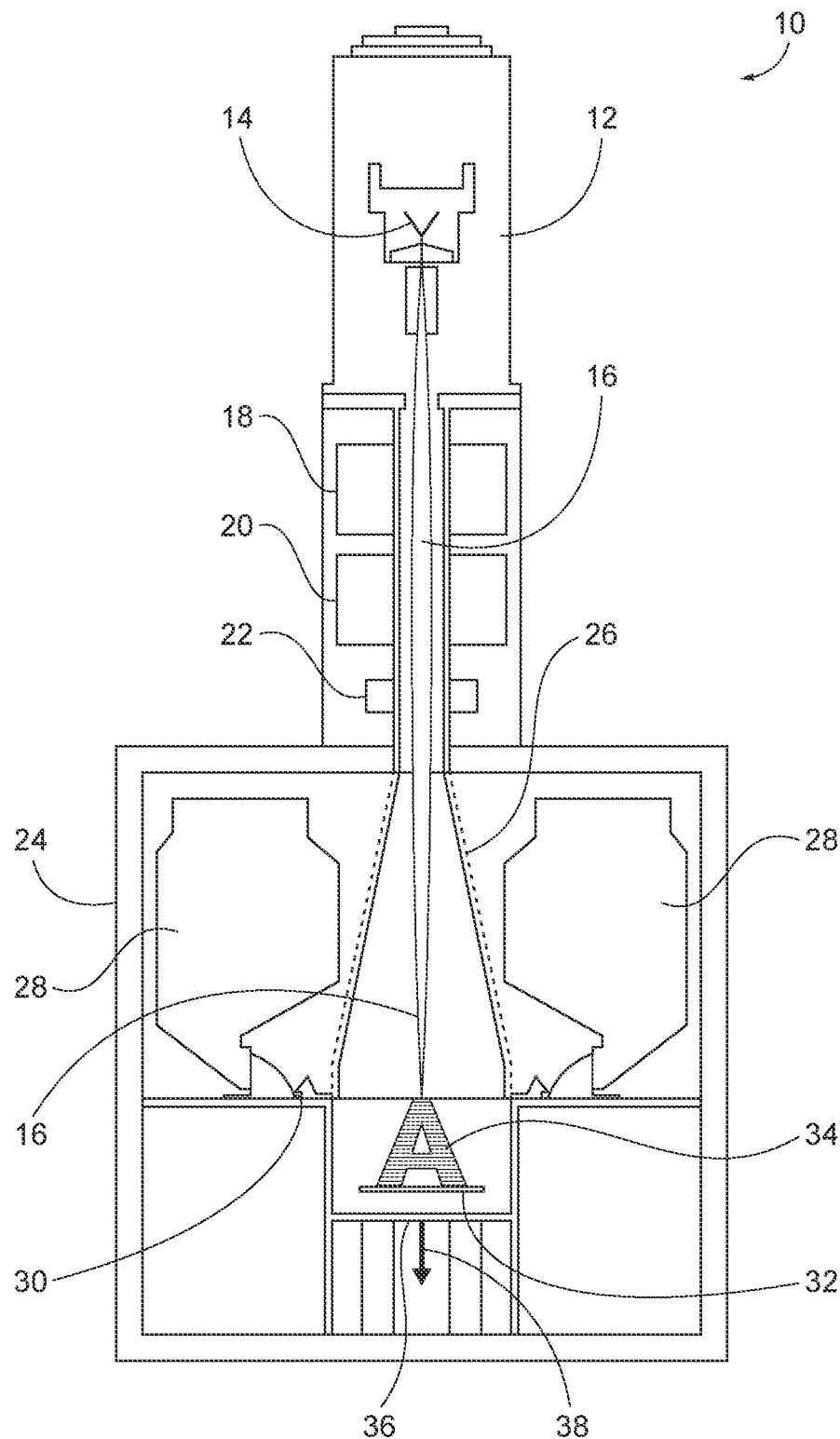
FIG. 2 is a schematic representation of illustrative, non-exclusive examples of an electron beam powder bed fusion machine that may be used to perform presently disclosed methods.
Figure 6:
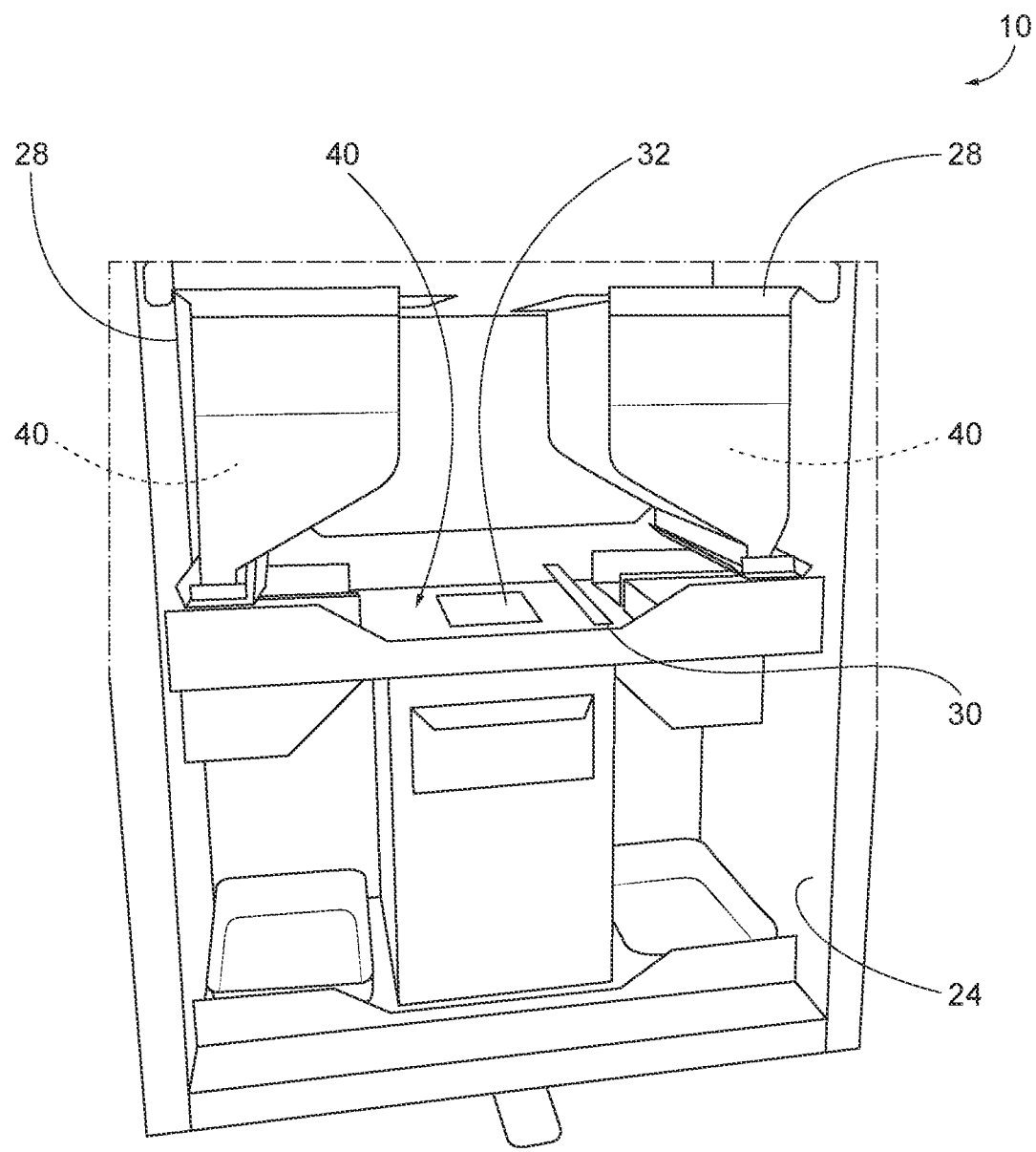
FIG. 6 is a schematic representation of an illustrative, non-exclusive example of an electron beam powder bed fusion machine that may be used to perform presently disclosed methods.
Figure 7:
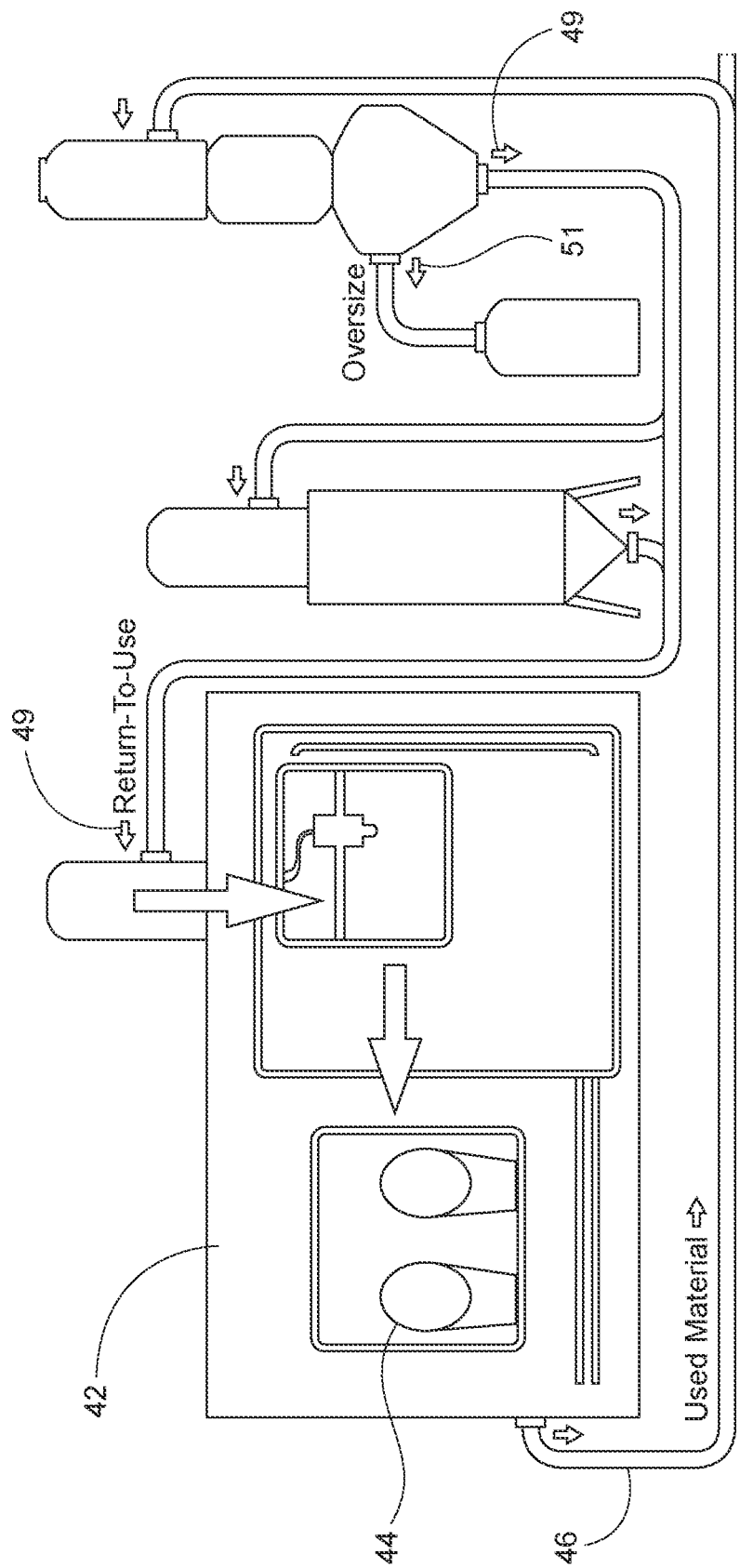
FIG. 7 is a schematic representation of a system for retrieving and filtering waste powder from a laser beam powder bed fusion machine.

FIGS. 2 and 6-7 provide illustrative, non-exclusive examples of electron beam powder bed fusion (EB-PBF) machines 10 that may be utilized in methods according to the present disclosure. Elements that serve a similar, or at least substantially similar, purpose are labeled with like numbers in each of FIGS. 2 and 6-7, and these elements may not be discussed in detail herein with reference to each of FIGS. 2 and 6-7. Similarly, all elements may not be labeled in each of FIGS. 2 and 6-7, but reference numerals associated therewith may be utilized herein for consistency. Elements, components, and/or features that are discussed herein with reference to one or more of FIGS. 2 and 6-7 may be included in and/or utilized with any of FIGS. 2 and 6-7 without departing from the scope of the present disclosure. Advantageously, disclosed methods may be implemented using conventional, existing EB-PBF machines 10.

In general, elements that are likely to be included in a given (i.e., a particular) example are illustrated in solid lines, while elements that are optional to a given example are illustrated in dashed lines. However, elements that are shown in solid lines are not essential to all examples, and an element shown in solid lines may be omitted from a particular example without departing from the scope of the present disclosure.

The present disclosure concerns methods of pre-heating EB-PBF machines 10 to enable the use of waste powder from laser bed powder bed fusion (LB-PBF) machines in EB-PBF machines 10. Disclosed methods solve the problem of wasting costly powder leftover from LB-PBF processes by finding a way to re-use, or re-purpose, this waste powder in EB-PBF machines 10 in a surprising and novel way, given that it is understood and accepted in the art that the same powder cannot be used in both EB-PBF machines 10 and LB-PBF machines, as it would be unstable to try to do so. Disclosed methods also may expand the usefulness and applicability of EB-PBF additive manufacturing in industry, and/or may create a new waste stream for LB-PBF to provide additional value.

With reference to FIG. 2, a generic representation of EB-PBF machines 10 is shown. Said EB-PBF machines 10 may be used to implement methods according to the present disclosure. To additively manufacture parts, an electron beam column 12 may include a filament 14 used to direct an electron beam 16 through one or more lenses (e.g., an astigmatism lens 18, a focus lens 20, and/or a deflection lens 22) into a vacuum sealed build chamber 24. A heat shield 26 within build chamber 24 may shield the powder in one or more build tanks, or hoppers 28, from heat generated by electron beam 16 within build chamber 24 such that the powder in hoppers 28 is not fused together within hoppers 28. Once the predetermined preheated temperature is reached within build chamber 24, a rake 30 may be used to retrieve powder from gravity-fed hoppers 28 and then spread, or distribute, the powder onto a start plate, or build plate 32. Electron beam 16 is used to selectively melt, or fuse, desired portions of the powder on build plate 32 to form a layer of a three-dimensional part 34. Then, a build platform 36 on which build plate 32 is positioned is lowered (e.g., along arrow 38), rake 30 is used to spread a new layer of powder onto build plate 32, and electron beam 16 impinges the next layer of the powder to form the next layer of part 34, which is shown in the process of being formed in FIG. 2.

Figure 3:
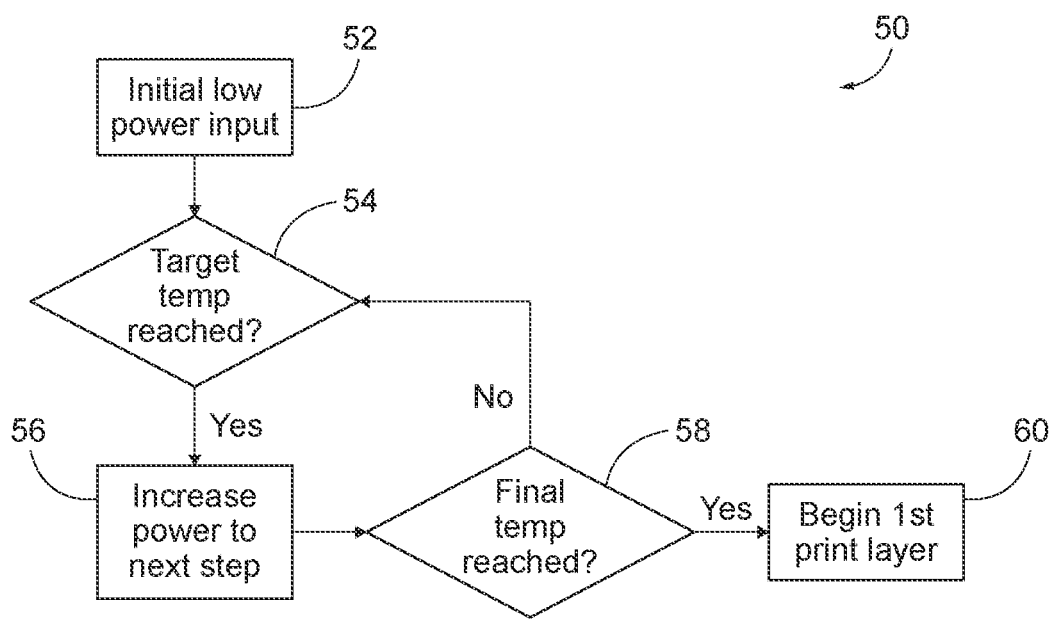
FIG. 3 is a schematic, high-level flowchart diagram representing presently disclosed methods of pre-heating an electron beam powder bed fusion machine using waste powder retrieved from a laser beam powder bed fusion system.
Figure 5:
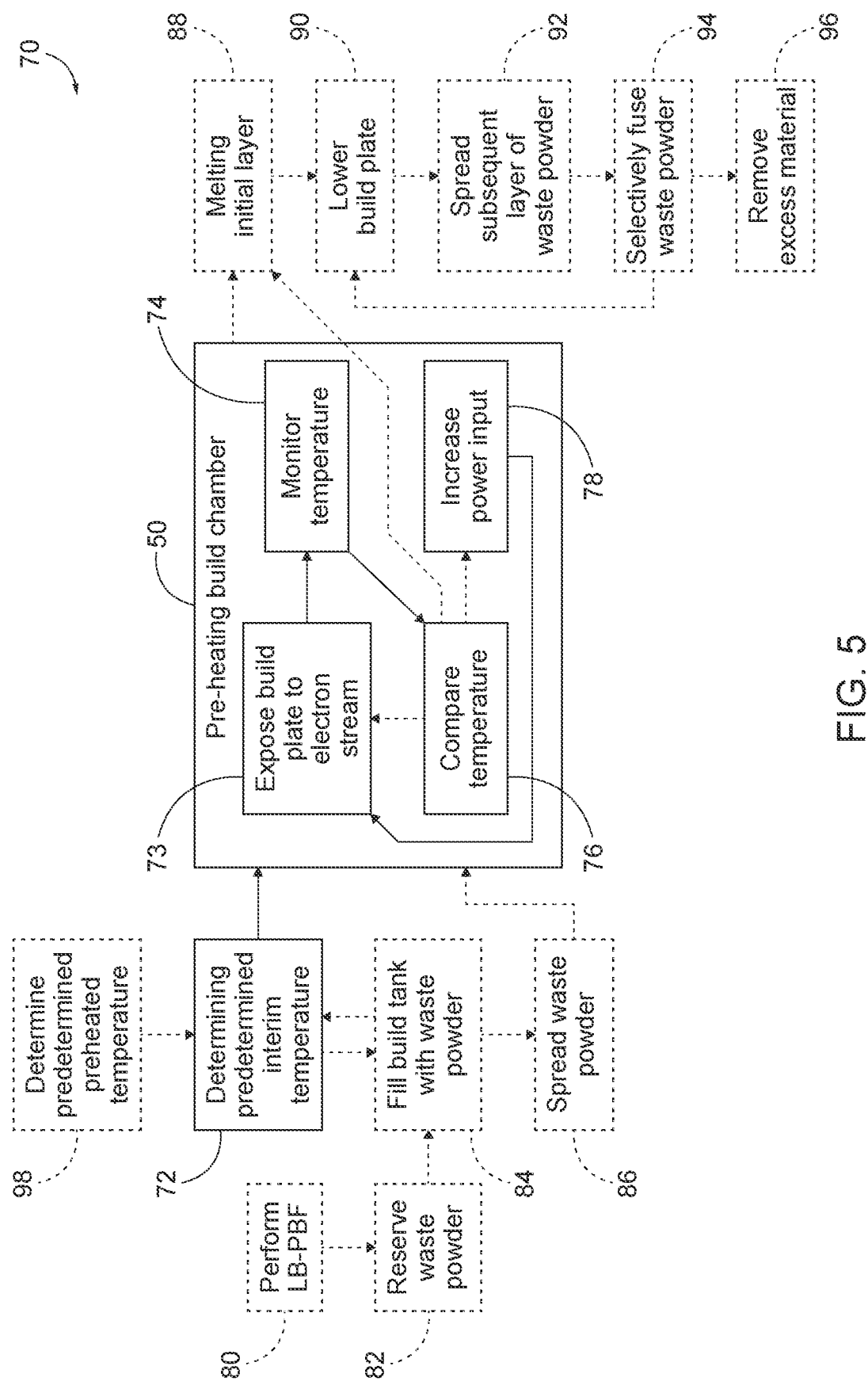
FIG. 5 is a schematic flowchart diagram representing examples of presently disclosed methods of pre-heating an electron beam powder bed fusion machine using waste powder retrieved from a laser beam powder bed fusion system.
Figure 8:
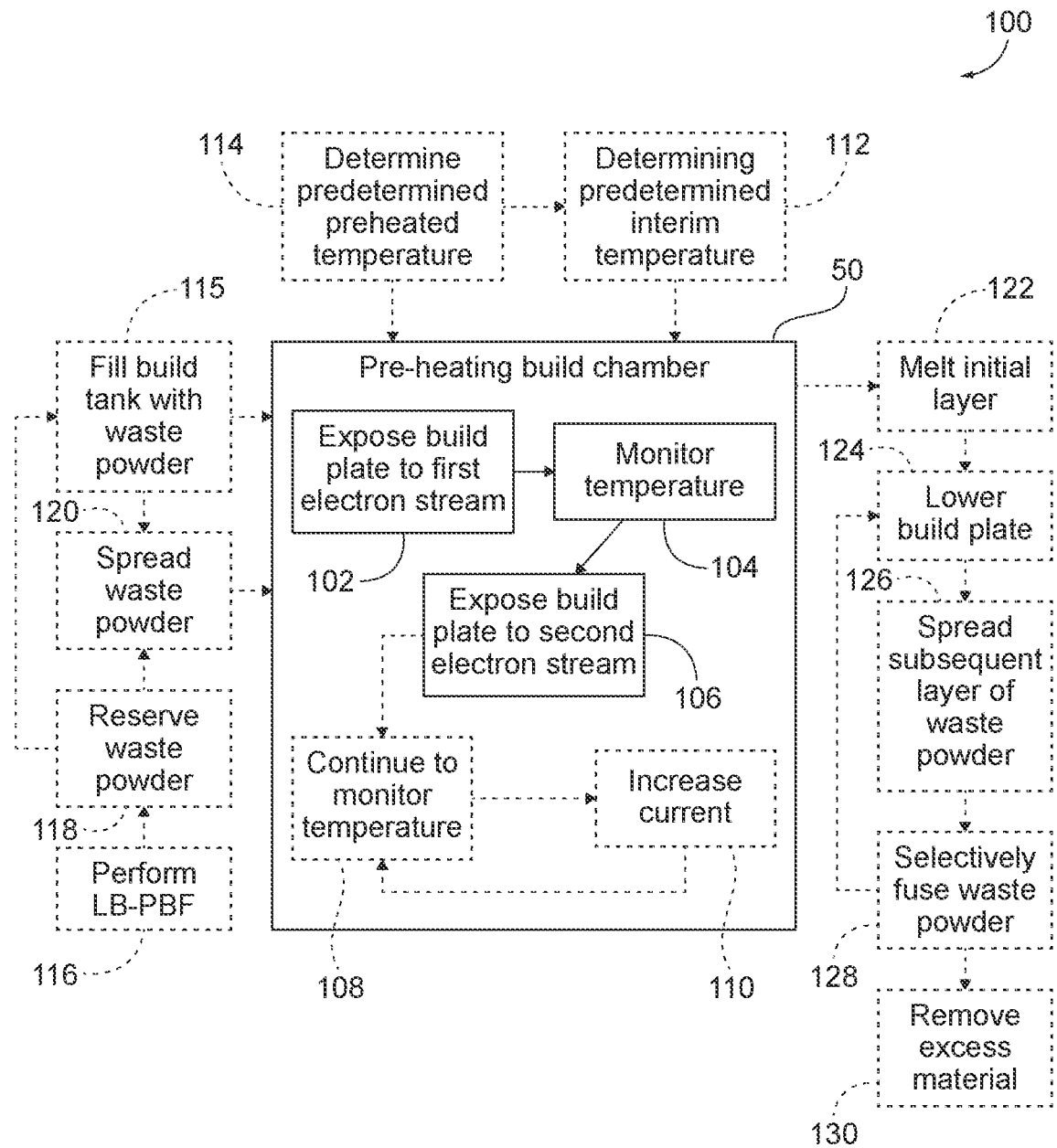
FIG. 8 is a schematic flowchart diagram representing examples of presently disclosed methods of pre-heating an electron beam powder bed fusion machine using waste powder retrieved from a laser beam powder bed fusion system.

Before the layers of part 34 begin to be formed, build chamber 24 is pre-heated to a predetermined preheated temperature. FIGS. 3, 5, and 8 schematically provide flowcharts that represent illustrative, non-exclusive examples of methods of preheating EB-PBF machines 10, according to the present disclosure. In FIGS. 3, 5, and 8, some steps may be illustrated in dashed boxes indicating that such steps may be optional or may correspond to an optional version of a method according to the present disclosure. That said, not all methods according to the present disclosure are required to include the steps illustrated in solid boxes. The methods and steps illustrated in FIGS. 3, 5, and 8 are not limiting and other methods and steps are within the scope of the present disclosure, including methods having greater than or fewer than the number of steps illustrated, as understood from the discussions herein.

Figure 1:
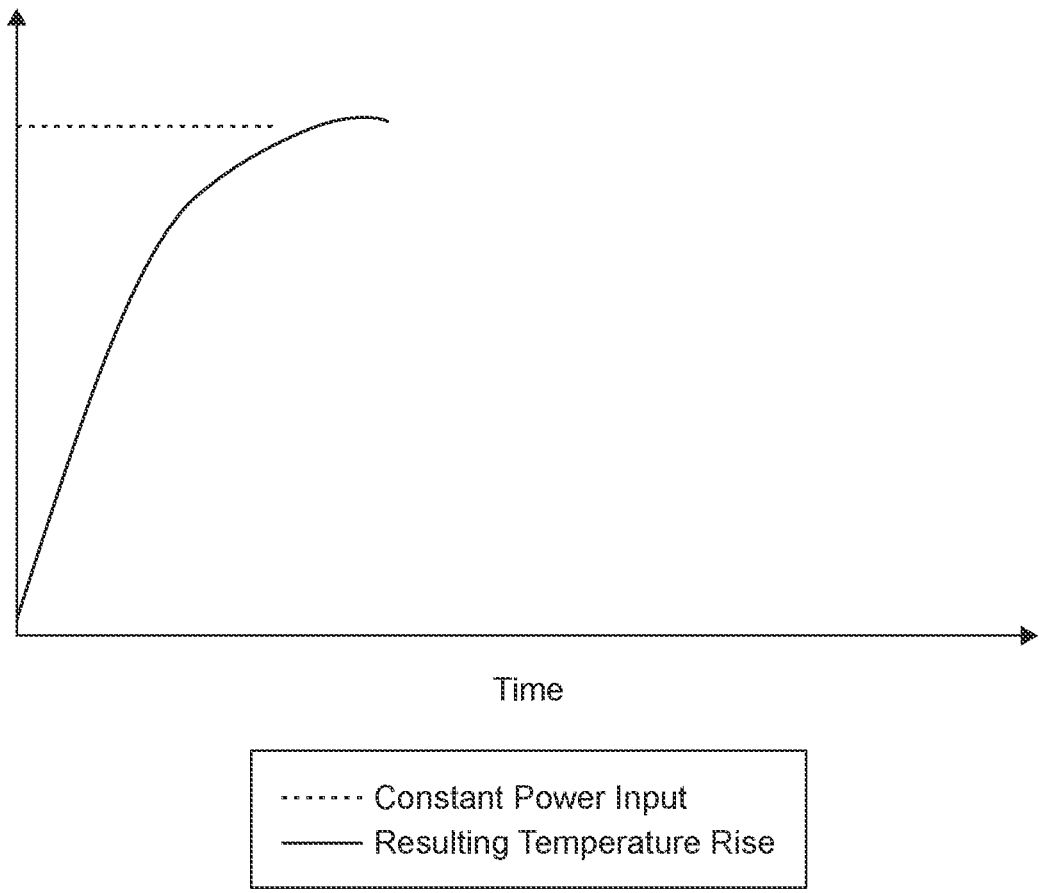
FIG. 1 is a prior art schematic graphical representation of the pre-heating of an electron beam powder bed fusion machine, showing the rise in temperature of the build chamber over time, in response to a constant current electron beam.

In FIG. 3, a high level flowchart of a method 50 of pre-heating EB-PBF machines 10 is illustrated. In contrast to prior art conventional pre-heating methods where a high power input is provided to create a constant current of electrons to pre-heat the machine as quickly and efficiently as possible (see FIG. 1), presently disclosed methods 50 begin pre-heating EB-PBF machine 10 by providing an initial low power input at 52, such that a low current electron beam 16 is initially directed at build plate 32 to start to pre-heat build chamber 24. With reference to both FIG. 2 and FIG. 3, at step 54, it is determined whether a predetermined target temperature has been reached within build chamber 24. If the predetermined target temperature has been reached, the power input is increased, or stepped up, at 56, to increase the current of electron beam 16 within build chamber 24. If the predetermined target temperature has not been reached, then the initial power input level is continued at 52 until it is determined at 54 that the predetermined target temperature has been reached. Next, at step 58, it is determined whether the final predetermined preheated temperature has been reached. If not, then the power input is increased again at 56 to increase the current of electron beam 16 to thereby increase the temperature within build chamber 24 further. The process is repeated a plurality of times, until the final preheated temperature is reached within build chamber 24, at which point printing the first layer of part 34 may begin, at 60.

Figure 4:
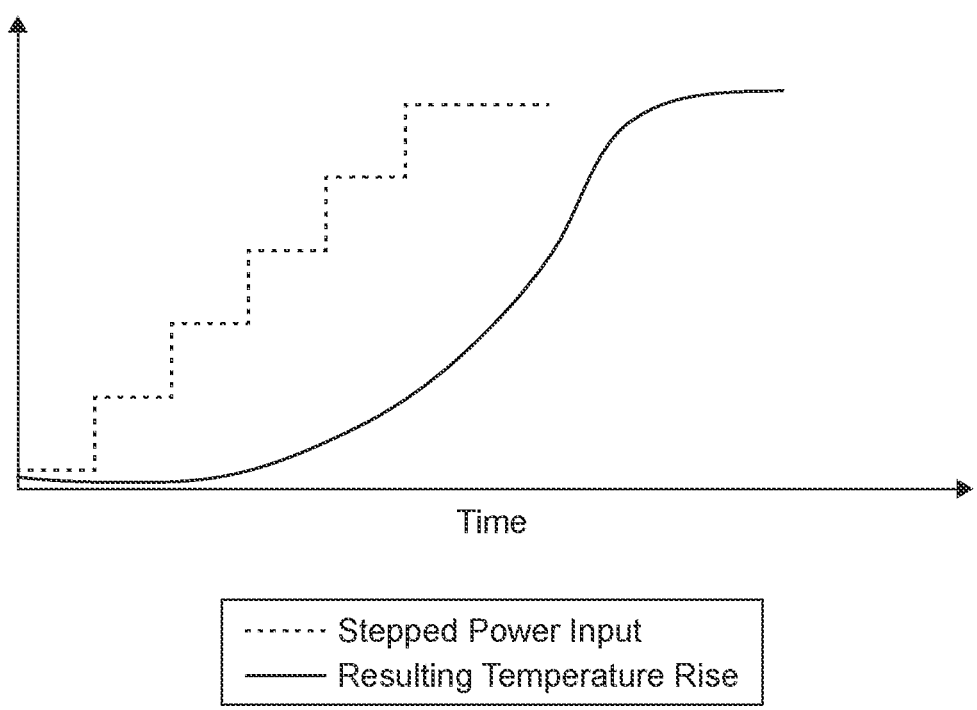
FIG. 4 is a schematic graphical representation of the pre-heating of an electron beam powder bed fusion machine, according to presently disclosed methods, showing the rise in temperature of the build chamber over time, in response to stepped increases in the current of the electron beam.

FIG. 4 graphically represents the stepped nature of the increases in power input of electron beam 16 during pre-heating methods 50. In FIG. 4, the dashed line represents power input to EB-PBF machine 10 over time, and indicates that the power level is increased in stepped increments. The temperature of build chamber 24 over time is represented by the solid line in FIG. 4. As visible by comparing FIG. 4 to FIG. 1, the temperature increase within build chamber 24 is slower using pre-heating methods 50 (FIG. 4) than in conventional pre-heating methods (FIG. 1), though ultimately the same desired pre-heated temperature may be accomplished via the presently disclosed pre-heating methods.

FIG. 5 is a schematic flowchart diagram of methods 70 of performing electron beam powder bed fusion (EB-PBF) additive manufacturing, according to the present disclosure. With reference to FIGS. 2 and 5, methods 70 generally include determining a plurality of predetermined interim temperatures at 72, with said predetermined interim temperatures ranging from an ambient, resting temperature of a build chamber of an EB-PBF machine (e.g., build chamber 24 of EB-PBF machine 10) to a predetermined preheated temperature, and further include pre-heating the build chamber to the predetermined preheated temperature, at 50. Each subsequent predetermined interim temperature of the plurality of predetermined interim temperatures is greater than each previous predetermined interim temperature of the plurality of predetermined interim temperatures. To pre-heat the build chamber at 50, a build plate within the build chamber (e.g., build plate 32) is exposed to a plurality of different streams of electrons (e.g., a plurality of different electron beams 16), one at a time, at 73. Each stream of electrons of the plurality of streams of electrons has a different respective current, and is configured to raise an actual temperature of the build chamber.

Pre-heating the build chamber at 50 also includes monitoring the actual temperature of the build chamber, at 74, during exposing the build plate to the plurality of streams of electrons at 73. For example, the temperature of the build chamber may be measured and monitored at 74 using one or more thermocouple sensors. Said thermocouple sensors may be positioned under and/or coupled to the build plate within the build chamber, and may be configured to measure the temperature of whatever it is in contact with (e.g., the build plate, the waste powder, etc.). Using information obtained during monitoring the actual temperature at 74, pre-heating the build chamber at 50 also includes comparing the actual temperature of the build chamber (as determined during the monitoring at 74) to the plurality of predetermined interim temperatures, at 76. Pre-heating the build chamber at 50 also includes increasing a power input of the EB-PBF machine a plurality of times, at 78, thereby exposing the build plate to a subsequent stream of electrons of the plurality of streams of electrons. Each time the power input is increased at 78, the resulting subsequent stream of electrons has a greater current level than the previous stream of electrons (at the previous, lower power input level). Increasing the power input at 78 is performed each time the actual temperature of the build chamber reaches a respective subsequent predetermined interim temperature of the plurality of predetermined interim temperatures, as determined during the comparing the actual temperature to the plurality of predetermined interim temperatures at 76. In this manner, pre-heating the build chamber at 50 is performed using stepped increases of electron beam current, rather than a single high power electron beam. Each current level of the electron beam is directed at the build plate for an amount of time necessary to increase the temperature of the build chamber to the next predetermined interim temperature, and then the current of the electron beam is stepped up to the next current level.

Generally, during the pre-heating the build chamber at 50, the build plate is surrounded by waste powder that is leftover and obtained from a LB-PBF system. For example, FIG. 6 illustrates the interior of build chamber 24 of another example of EB-PBF machine 10. In this view, powder 40 can be seen surrounding and/or underneath build plate 32. Additional powder 40 is stored within hoppers 28 that will be distributed for respective layers of the part being built, once pre-heating the build chamber at 50 is completed. During the pre-heating methods disclosed herein, electron beam 16 directly scans build plate 32, which also heats the rest of build chamber 24. Again, powder 40 may be obtained as waste powder from LB-PBF. To this end, methods 70

(FIG. 5) also may include performing LB-PBF to create an object at 80, and reserving the leftover, or waste powder from the LB-PBF process, at 82. This reserved waste powder can then be used to at least partially fill one or more build tanks, or hoppers (e.g., hoppers 28) of an EB-PBF machine, at 84. Said waste powder may be spread around the build plate within the build chamber of the EB-PBF machine prior to initiating the pre-heating the build chamber at 50. By using waste powder leftover from LB-PBF processes, presently disclosed methods 70 may provide additive manufacturing methods with increased sustainability, cost savings, and/or having reduced hazards and waste. For example, it can cost upwards of $10,000 in materials to fill an EB-PBF machine with powder, and using repurposed powder that would otherwise be discarded after LB-PBF processes can create cost savings both in terms of savings for the cost of the powder that would otherwise be required to be purchased to fill the EB-PBF machine, and also in terms of savings in costs by reducing or eliminating hazardous disposal of waste powder from the LB-PBF machine.

FIG. 7 schematically represents a process of reserving waste powder from an LB-PBF system 42. Once parts 44 are completed (and/or between successive layer deposition of parts 44), used material, or waste powder is collected and removed from LB-PBF system 42, as indicated at 46. This un-melted waste powder may be collected and passed through a filter or sorter 48. Particles that are small enough to be re-used by the LB-PBF are separated and may be returned to LB-PBF system 42 for re-use, as indicated at arrow 49. On the other hand, waste powder that is deemed "oversized" or otherwise unsuitable for use may be separated, as indicated by arrow 51, and reserved for use in presently disclosed methods 50, 70. This oversized waste powder cannot be re-used in the LB-PBF system 42, and has to be discarded in conventional methods. These oversized particles are often particles that got stuck together or became misshapen during the LB-PBF process.

With continued reference to FIG. 5, once the build chamber has been pre-heated at 50 to the predetermined preheated temperature, an initial layer of waste powder may be spread on the build plate, and then selectively melted, or fused, using the EB-PBF machine, to form the first layer of the part being manufactured, at 88. Specifically, selectively fusing or melting each layer of the part being manufactured may include deflecting an electron beam via an electromagnetic field, thereby selectively fusing portions of the initial or a subsequent layer of the waste powder by raising the actual temperature of the portions of the initial or subsequent layer of the waste powder to above a melting point of the waste powder. Then, methods 70 may further include lowering the build plate at 90, spreading a subsequent layer of the waste powder across the build area such that the subsequent layer of the waste powder at least partially overlaps a previous layer of the waste powder at 92, and selectively fusing portions of the subsequent layer of the waste powder to the previous layer of the waste powder by heating the portions of the subsequent layer above the melting point of the waste powder, at 94. The lowering the build plate at 90, spreading the subsequent layer of waste powder at 92, and selectively fusing portions of the layer at 94 may be performed a plurality of times (i.e., once per layer of the part being built), until the additively manufactured part is complete. Once the part is finished, excess material may be removed from the EB-PBF machine, at 96. For example, excess material may be removed at 96, such as from internal channels and/or around the resulting additively manufactured part.

Turning now to details of pre-heating the build chamber at 50, each successive stream of electrons of the plurality of streams of electrons sequentially used to preheat the build chamber generally has a different, increasing current from the previous stream of electrons used. For example, each stream of electrons of the plurality of streams of electrons may have a respective current that is at least 1 milliamp (mA) lower, at least 2 mA lower, at least 3 mA lower, at least 4 mA lower, at least 5 mA lower, at least 6 mA lower, at least 7 mA lower, at least 8 mA lower, at least 9 mA lower, and/or at least 10 mA lower than each subsequent stream of electrons of the plurality of streams of electrons. In some examples, each stream of electrons of the plurality of streams of electrons has a respective current that is between 5-10 mA higher than each previous stream of electrons of the plurality of streams of electrons. In pre-heating the build chamber at 50, the exposing the build plate to an electron stream at 73 may be performed a plurality of times, at least equal to the number of different electron streams that are used to pre-heat the build chamber. In some examples, at least 3 different streams of electrons, at least 4 different streams of electrons, at least 5 different streams of electrons, at least 6 different streams of electrons, at least 7 different streams of electrons, at least 8 different streams of electrons, at least 9 different streams of electrons, at least 10 different streams of electrons, and/or at most 20 different streams of electrons may be used during the pre-heating process. In some examples, at least one of the streams of electrons has a current below 10 mA, below 5 mA, and/or below 1 mA. In some examples, exposing the build plate to electron streams at 73 may include exposing the build plate to respective streams of electrons having respective currents of 1 mA, 5 mA, 10 mA, 15 mA, 20 mA, 25 mA, 30 mA, 35 mA, 40 mA, 45 mA, 48 mA, and/or 50 mA, though use of electron currents between these values is also within the scope of the present disclosure.

Some methods 70 include determining the predetermined preheated temperature, at 98. The predetermined preheated temperature may be at least partially dependent on a material composition of the waste powder. In other words, a different preheated temperature may be predetermined at 72 for each different powder composition or material used in a given method 70. For metallic powders, the predetermined preheated temperature may be between 700° C. and 800 degrees Celsius (° C.), though in some examples may be even lower than 700° C. or even higher than 800° C.

Generally, the pre-heating the build chamber at 50 may be configured such that it is sufficiently slow to at least substantially allow for dissipation of any static charge of the waste powder in the build chamber during pre-heating. Additionally or alternatively, the pre-heating the build chamber to the predetermined preheated temperature at 50 may be performed sufficiently slowly enough to at least substantially prevent smoking of the waste powder within the build chamber. In some examples, the pre-heating the build chamber to the predetermined preheated temperature at 50 takes at least 45 minutes, at least 50 minutes, at least 55 minutes, at least 60 minutes, at least 65 minutes, at least 70 minutes, at least 75 minutes, at least 80 minutes, at least 85 minutes, at least 90 minutes, at least 95 minutes, at least 100 minutes, and/or at most 120 minutes. Disclosed methods 50, 70 of pre-heating EB-PBF machines 10 thus may spend an hour, an hour and a half, or even longer, pre-heating according to the stepped electron beam current increases disclosed herein, while on the other hand, pre-heating EB-PBF machines 10 according to conventional methods is performed as quickly as possible, using a single stream of electrons (typically at a high current of 48 mA; see FIG. 1), and often takes as little as 30 minutes or less. Those with skill in the additive manufacturing field are taught to be as quick and efficient as possible in the use of these machines and in additive manufacturing in general, and thus perform pre-heating as quickly as possible, using the powder recommended according to manufacturer-provided instructions. In contrast, presently disclosed methods are significantly slower, less efficient, and utilize powder that is different from what the EB-PBF machine manufacturers instruct for use with their machines.

Tables 1-4 below provide illustrative, non-exclusive examples of pluralities of currents of electron streams that may be used to pre-heat a build chamber according to methods 50, 70 of the present disclosure. In the tables, the build plate is impinged with an electron beam having the current shown in the left column, until the actual temperature within the build chamber reaches the predetermined interim temperature shown in the right column (the predetermined interim temperatures having been predetermined at 72). Then, according to disclosed methods, each time a respective predetermined interim temperature is reached or exceeded, the power input of the EB-PBF machine is increased at 78, thereby stepping up the electron beam current to the next level shown.

TABLE 1

| Beam Current (mA) | Predetermined Temp (° C.) |
|---|---|
| 1 | 32 |
| 10 | 70 |
| 20 | 135 |
| 25 | 186 |
| 30 | 336 |
| 35 | 486 |
| 40 | 601 |
| 45 | 650 |
| 48 (default) | 730 |

TABLE 2

| Beam Current (mA) | Predetermined Temp (° C.) |
|---|---|
| 1 | 40 |
| 10 | 100 |
| 20 | 161 |
| 25 | 241 |
| 30 | 362 |
| 35 | 511 |
| 40 | 620 |
| 45 | 671 |
| 48 (default) | 730 |

TABLE 3

| Beam Current (mA) | Predetermined Temp (° C.) |
|---|---|
| 1 | 34 |
| 10 | 100 |
| 20 | 161 |
| 25 | 241 |
| 30 | 366 |
| 35 | 512 |
| 40 | 620 |

TABLE 3-continued

| Beam Current (mA) | Predetermined Temp (° C.) |
|---|---|
| 45 | 672 |
| 48 (default) | 730 |

TABLE 4

| Beam Current (mA) | Predetermined Temp (° C.) |
|---|---|
| 10 | 102 |
| 20 | 162 |
| 25 | 243 |
| 30 | 365 |
| 35 | 512 |
| 40 | 620 |
| 45 | 671 |
| 48 (default) | 730 |

Disclosed methods of pre-heating a build chamber of an EB-PBF machine at 50 may include exposing the build plate to each respective stream of electrons until the desired predetermined interim temperature is reached, rather than for a predetermined period of time. Though in various examples of methods 50, 70, one or more of the respective beam currents may be applied to the build plate at 73 for at least 1 minute, at least 2 minutes, at least 3 minutes, at least 4 minutes, at least 5 minutes, at least 10 minutes, at least 15 minutes, at least 20 minutes, and/or at most 30 minutes before the power input is increased at 78 to increase the current of the electron beam to the next indicated level. In some examples, the exposing the build plate to the plurality of streams of electrons at 73 is performed for different respective amounts of time for each respective stream of electrons of the plurality of streams of electrons depending on how long it takes the build chamber to reach the desired predetermined interim temperature. For example, in the example shown in Table 1, a 1 mA electron beam is directed at the build plate and the temperature is monitored within the build chamber at 74. The actual temperature of the build chamber (determined by monitoring at 74) is compared to the predetermined interim temperatures at 76. In this example, the 1 mA electron beam is applied until the actual temperature of the build chamber is determined to be 32° C. or higher. Once the actual temperature of the build chamber reaches or exceeds 32° C., the power input is increased at 78, to apply the subsequent current level of the electron beam, which in this case is a 10 mA electron beam. The 10 mA electron beam is applied to the build plate until the actual temperature of the build chamber reaches or exceeds the next predetermined interim temperature, which in the example of Table 1 is 70° C. The amount of time the 1 mA electron beam is applied to the build plate may be less than, greater than, or approximately equal to the time the 10 mA electron beam is applied to the build plate, depending on how long it takes the actual temperature of the build chamber to reach the respective predetermined interim temperature.

The process of stepped increases in electron beam current is repeated for each of the predetermined interim temperatures that was determined at 72. In the example of Table 1, the predetermined interim temperatures are 32° C., 70° C., 135° C., 186° C., 336° C., 486° C., 601° C., and 650° C., and the predetermined preheated temperature is 730° C. In the other examples, the predetermined interim temperatures may be different, even for the same predetermined preheated temperature of 730° C. For example, in the example of Table 2, the predetermined interim temperatures are 40° C., 100° C., 161° C., 241° C., 362° C., 511° C., 620° C., and 671° C. These examples are non-limiting, and for illustrative purposes only. In general, each subsequent predetermined interim temperature of the plurality of predetermined interim temperatures is greater than each previous predetermined interim temperature of the plurality of predetermined interim temperatures. In some examples, the difference from one predetermined interim temperature to the next predetermined interim temperature may be at least 30 degrees ° C., at least 40° C., at least 50° C., at least 60° C., at least 70° C., at least 80° C., at least 90° C., at least 100° C., at least 110° C., at least 120° C., at least 130° C., at least 140° C., at least 150° C., and/or at most 200° C. Additionally or alternatively, each respective subsequent predetermined interim temperature of the plurality of predetermined interim temperatures may be greater than each respective previous predetermined interim temperature of the plurality of predetermined interim temperatures by a different respective amount. Other methods of pre-heating EB-PBF machines according to the present disclosure may include determining more or fewer predetermined interim temperatures at 72, and/or determining a greater or lower predetermined preheated temperature at 98 (which may vary depending on the material of powder being used and/or other desired parameters).

Additionally or alternatively, different currents of electron beams may be used for the pre-heating of the EB-PBF machine at 50 than shown in the examples of above. For example, while the examples shown in Tables 1-3 use 1 mA electron beam to pre-heat the build chamber to the initial predetermined interim temperature, the example shown in Table 4 uses a 10 mA electron beam to pre-heat the build chamber to the initial predetermined temperature. In other examples, electron beams between 1 mA and 10 mA may be used in addition to or instead of the 1 mA and/or 10 mA electron beams shown in the examples provided above. In some examples, pre-heating the build chamber to the predetermined preheated temperature at 50 may have an overall rate of temperature increase of less than 20° C. per minute (° C./min), less than 15° C./min, less than 10° C./min, and/or less than 5° C./min. In a specific example, pre-heating the build chamber to the predetermined preheated temperature may have an overall rate of temperature increase of between 6-8° C./min. In the example shown in Table 1 above, the total elapsed time to reach the predetermined preheated temperature of 730° C. was 1 hour, 39 minutes, and 21 seconds, and thus had an overall rate of temperature increase of about 7.1° C./min. In the example shown in Table 2 above, the total elapsed time to reach the predetermined preheated temperature of 730° C. was 1 hour, 32 minutes, and 16 seconds, and thus had an overall rate of temperature increase of about 7.6° C./min. In the example shown in Table 3 above, the total elapsed time to reach the predetermined preheated temperature of 730° C. was 1 hour, 30 minutes, and 22 seconds, and thus had an overall rate of temperature increase of about 7.8° C./min. Finally, in the example shown in Table 4 above, the total elapsed time to reach the predetermined preheated temperature of 730° C. was 1 hour, 44 minutes, and 31 seconds, and thus had an overall rate of temperature increase of about 6.7° C./min.

Pre-heating the build chamber at 50 may be actively and/or manually controlled, in some examples. For example, the pre-heating the build chamber to the predetermined preheated temperature at 50 may include actively and/or manually controlling the power input of the EB-PBF machine to deliver stepped increases of electron beam current, such as by actively and/or manually modifying one or more machine parameters of the EB-PBF machine each time a respective predetermined interim temperature is reached, and/or by actively and/or manually setting custom parameters on the EB-PBF machine that are different from the manufacturer's instructions for operation. In other examples, pre-heating the build chamber at 50 may be passively controlled, and/or automated. In some examples, pre-heating the build chamber at 50 is not pre-programmed. Additionally or alternatively, pre-heating the build chamber to the predetermined preheated temperature at 50 is not based on predetermined time intervals, in some examples, though other examples may be based on predetermined time intervals for each level of power input (e.g., for each different current of the electron beam).

The waste powder used in disclosed methods 70 may be a metallic powder. In specific examples, the waste powder may be a titanium alloy powder, such as Ti-6Al-4V powder, though other materials are also within the scope of the present disclosure. For example, other suitable powders may include nickel, cobalt, steel (e.g., stainless steel, tool steel, etc.), aluminum, and/or tungsten-based powders. The waste powder used in disclosed methods may have an average particle size of less than 60 micrometers (μm), less than 50 μm, and/or less than 40 μm in diameter. In other words, presently disclosed methods 70 may enable, or may be configured to utilize, powders having a smaller size than is recommended or possible to use in EB-PBF machines in conventional methods of pre-heating.

FIG. 8 illustrates methods 100 of performing EB-PBF additive manufacturing according to the present disclosure, which include other examples of pre-heating a build chamber of an EB-PBF machine to a predetermined preheated temperature, at 50. In methods 100, pre-heating the build chamber at 50 includes exposing a build plate within the build chamber to a first stream of electrons at a first current for a first time period sufficient to pre-heat the build chamber to a predetermined first interim temperature, at 102. Similar to methods 70, pre-heating the build chamber at 50 in methods 100 is performed while the build plate is surrounded by waste powder that is leftover and obtained from a LB-PBF system, and methods 100 also include monitoring an actual temperature of the build chamber to determine when the actual temperature of the build chamber reaches the predetermined first interim temperature, at 104. Pre-heating the build chamber at 50 also includes exposing the build plate to a second stream of electrons at 106, once the monitoring at 104 reveals that the actual temperature of the build chamber has reached the predetermined first interim temperature. The second stream of electrons that the build plate is exposed to at 106 has a second current that is greater than the first current than was used at 102. Exposing the build plate to the second stream of electrons at 106 is performed for a second time period sufficient to pre-heat the build plate to a predetermined second interim temperature, with the predetermined second interim temperature being greater than the predetermined first interim temperature and less than the predetermined preheated temperature. For example, to apply the example from Table 1 above, the build plate is exposed to a first, 1 mA stream of electrons at 102, for a first time period, until the actual temperature of the build chamber reaches or exceeds the first predetermined interim temperature of 32° C. Then, the build plate is exposed to a second, 10 mA stream of electrons at 106, for a second time period, until the actual temperature of the build chamber reaches or exceeds the second predetermined interim temperature of 70° C. As is clear from this example, the second predetermined interim temperature (70° C., this is example) is greater than the first predetermined interim temperature (32° C., in this example), and less than the predetermined preheated temperature (730° C., in this example).

Pre-heating the build chamber at 50 in methods 100 also may include continuing to monitor the actual temperature of the build chamber at 108 and increasing a current level of the electron beam output by the EB-PBF machine, at 110, each time the build chamber reaches a subsequent predetermined interim temperature, and until the build chamber reaches the predetermined preheated temperature. In other words, the continuing to monitor the actual temperature of the build chamber at 108 and then increasing the current of the electron beam at 110 may each be performed a plurality of times, according to the plurality of predetermined temperatures, until the build chamber is sufficiently pre-heated to the predetermined preheated temperature. With reference again to the example from Table 1 above, once the actual temperature of the build chamber reaches the second predetermined interim temperature of 70° C., the power input is increased at 110 to increase the current of the electron beam to the next level, which is 20 mA in this example. The 20 mA electron beam is applied for a time period sufficient to raise the actual temperature of the build chamber to the next predetermined interim temperature, which is 135° C. in this example. Meanwhile, the actual temperature of the build chamber is then continued to be monitored at 108 until it reaches or exceeds the next predetermined interim temperature (135° C.), at which point the power input is increased again at 110 to the next current level of 25 mA. This process is repeated for each electron beam current level and each predetermined interim temperature, until the actual temperature of the build chamber reaches or exceeds the predetermined preheated temperature (730° C. in this example).

Like methods 70, methods 100 also may include determining a plurality of predetermined interim temperatures at 112, with the predetermined interim temperatures ranging from an ambient, resting temperature of the build chamber to the predetermined preheated temperature. Each subsequent predetermined interim temperature of the plurality of predetermined interim temperatures determined at 112 is greater than each previous predetermined interim temperature of the plurality of predetermined interim temperatures. Likewise, methods 100 also may include determining the predetermined preheated temperature, at 114.

Specifically speaking, the continuing to monitor the temperature at 108 typically includes monitoring the actual temperature of build chamber to determine when the actual temperature of the build chamber reaches the predetermined second interim temperature. Then, the increasing the current at 110 includes exposing the build plate to a third stream of electrons once the actual temperature of the build chamber reaches the predetermined second interim temperature. The third stream of electrons has a third current that is greater than the second current, and the build plate may be exposed to the third stream of electrons at 110 for a third time period sufficient to pre-heat the build chamber to a predetermined third interim temperature, wherein the predetermined third interim temperature is greater than the predetermined second interim temperature and less than the predetermined preheated temperature. As noted, steps 108 and 110 may be repeated a plurality of times (e.g., each time the actual temperature of the build chamber reaches a subsequent respective interim temperature of the plurality of predetermined interim temperatures), until the actual temperature of the build chamber reaches or exceeds the predetermined preheated temperature.

As with methods 70, methods 100 may include actively and/or manually controlling the power input of the EB-PBF machine (e.g., actively and/or manually modifying one or more machine parameters of the EB-PBF machine) to deliver the stepped increases of electron beam current according to methods 50. Similarly, pre-heating the build chamber to the predetermined preheated temperature at 50 in methods 100 may be configured to be sufficiently slow such that a static charge of the waste powder is substantially allowed to dissipate, and/or sufficiently slow enough to at least substantially prevent smoking of the waste powder within the EB-PBF machine.

Methods 100 also may include other steps of the additive manufacturing process, such as at least partially filling a build tank of the EB-PBF machine with waste powder obtained from a LB-PBF system, at 115. To this end, methods 100 may include performing LB-PBF to create an object at 116 and reserving the waste powder left over from the performing LB-PBF, at 118, to use in EB-PBF manufacturing. In other words, the waste powder reserved at 118 may be used to at least partially fill the build tank of an EB-PBF machine at 115 and/or to spread within the EB-PBF machine, at 120 (e.g., the waste powder may be spread across and/or around the build plate of the EB-PBF machine at 120). Once the EB-PBF machine is pre-heated at 50, methods 100 additionally or alternatively may include deflecting an electron beam via an electromagnetic field, thereby selectively fusing portions of an initial layer of the waste powder at 122, by raising the actual temperature of the portions of the initial layer of the waste powder to above a melting point of the waste powder. To continue the additive manufacturing process, methods 100 may include lowering the build plate at 124, spreading a subsequent layer of the waste powder across a build area at 126, and selectively fusing portions of the subsequent layer of the waste powder by heating the portions of the subsequent layer above the melting point of the waste powder at 128. Steps 124, 126, and 128 may be repeated any desired number of times until the desired part is completed, and then methods 100 may include removing excess material from internal channels and/or around the resulting additively manufactured part, at 130.

Parts made according to methods 50, 70, 100 of the present disclosure are also within the scope of the disclosure. Illustrative examples of parts that may be made in EB-PBF machines using waste powder from LB-PBF systems, may include parts or components (e.g., turbine blades or engine parts) for aircraft or other vehicles, topology optimized tapered box beams, medical devices, and many other applications.

Illustrative, non-exclusive examples of inventive subject matter according to the present disclosure are described in the following enumerated paragraphs:

A1. A method of performing electron beam powder bed fusion (EB-PBF) additive manufacturing, comprising:
    determining a plurality of predetermined interim temperatures ranging from an ambient, resting temperature of a build chamber of an EB-PBF machine to a predetermined preheated temperature, wherein each subsequent predetermined interim temperature of the plurality of predetermined interim temperatures is greater than each previous predetermined interim temperature of the plurality of predetermined interim temperatures; and pre-heating the build chamber to the predetermined preheated temperature, wherein the pre-heating the build chamber comprises:
  exposing a build plate within the build chamber to a plurality of streams of electrons, one at a time, wherein the build plate is surrounded by waste powder that is leftover and obtained from a laser beam powder bed fusion system, wherein each stream of electrons of the plurality of streams of electrons has a different respective current, and wherein each stream of electrons of the plurality of streams of electrons is configured to raise an actual temperature of the build chamber;
  monitoring the actual temperature of the build chamber during the exposing the build plate to the plurality of streams of electrons;
  comparing the actual temperature of the build chamber to the plurality of predetermined interim temperatures; and
  increasing a power input of the EB-PBF machine a plurality of times, thereby exposing the build plate to a subsequent stream of electrons of the plurality of streams of electrons, wherein the subsequent stream of electrons has a greater current level than a previous stream of electrons of the plurality of streams of electrons, and wherein the increasing the power input is performed each time the actual temperature of the build chamber reaches a respective subsequent predetermined interim temperature of the plurality of predetermined interim temperatures, as determined during the comparing the actual temperature to the plurality of predetermined interim temperatures.

A1.1. The method of paragraph A1, further comprising at least partially filling a build tank of the EB-PBF machine with the waste powder obtained from the laser beam powder bed fusion system.

A1.2. The method of paragraph A1 or A1.1, further comprising spreading an initial layer of the waste powder on a build plate within the build chamber, after the pre-heating the build chamber to the predetermined preheated temperature.

A2. The method of any of paragraphs A1-A1.2, wherein the pre-heating the build chamber to the predetermined preheated temperature comprises actively controlling the power input of the EB-PBF machine to deliver stepped increases of electron beam current.

A2.1. The method of any of paragraphs A1-A2, wherein the pre-heating the build chamber to the predetermined preheated temperature comprises manually controlling a/the power input of the EB-PBF machine to deliver stepped increases of electron beam current.

A3. The method of paragraph A2, wherein the actively controlling the power input of the EB-PBF machine comprises modifying one or more machine parameters of the EB-PBF machine each time a respective predetermined interim temperature is reached.

A3.1. The method of paragraph A2.1 and/or A3, wherein the manually controlling the power input of the EB-PBF machine comprises modifying one or more machine parameters of the EB-PBF machine each time a respective predetermined interim temperature is reached.

A4. The method of any of paragraphs A1-A3.1, wherein the pre-heating the build chamber to the predetermined preheated temperature is not based on predetermined time intervals.

A4.1. The method of any of paragraphs A1-A4, wherein the pre-heating the build chamber to the predetermined preheated temperature is not pre-programmed.

A5. The method of any of paragraphs A1-A4.1, wherein the pre-heating the build chamber to the predetermined preheated temperature is sufficiently slow such that a static charge of the waste powder is dissipated.

A6. The method of any of paragraphs A1-A5, wherein the pre-heating the build chamber to the predetermined preheated temperature is sufficiently slow enough to at least substantially prevent smoking of the waste powder.

A7. The method of any of paragraphs A1-A6, wherein each stream of electrons of the plurality of streams of electrons has a respective current that is at least 1 milliamp (mA) lower, at least 2 mA lower, at least 3 mA lower, at least 4 mA lower, at least 5 mA lower, at least 6 mA lower, at least 7 mA lower, at least 8 mA lower, at least 9 mA lower, and/or at least 10 mA lower than each subsequent stream of electrons of the plurality of streams of electrons.

A8. The method of any of paragraphs A1-A7, wherein each stream of electrons of the plurality of streams of electrons has a respective current that is between 5-10 mA higher than each previous stream of electrons of the plurality of streams of electrons.

A9. The method of any of paragraphs A1-A8, wherein the plurality of streams of electrons comprises at least 3 different streams of electrons, at least 4 different streams of electrons, at least 5 different streams of electrons, at least 6 different streams of electrons, at least 7 different streams of electrons, at least 8 different streams of electrons, at least 9 different streams of electrons, at least 10 different streams of electrons, and/or at most 20 different streams of electrons.

A10. The method of any of paragraphs A1-A9, wherein the plurality of streams of electrons comprises at least one stream of electrons having a current below 10 mA.

A11. The method of any of paragraphs A1-A10, wherein the plurality of streams of electrons comprises at least one stream of electrons having a current below 5 mA.

A12. The method of any of paragraphs A1-A11, wherein the plurality of streams of electrons comprises a stream of electrons having a current of 1 mA or less.

A13. The method of any of paragraphs A1-A12, wherein the plurality of streams of electrons comprises respective streams of electrons having respective currents of 1 mA, 5 mA, 10 mA, 15 mA, 20 mA, 25 mA, 30 mA, 35 mA, 40 mA, 45 mA, 48 mA, and/or 50 mA.

A14. The method of any of paragraphs A1-A13, further comprising determining the predetermined preheated temperature, wherein the predetermined preheated temperature is at least partially dependent on a material composition of the waste powder.

A15. The method of any of paragraphs A1-A14, wherein the waste powder comprises a metallic powder.

A16. The method of any of paragraphs A1-A15, wherein the waste powder comprises a titanium alloy powder.

A17. The method of any of paragraphs A1-A16, wherein the waste powder comprises Ti-6Al-4V powder.

A18. The method of any of paragraphs A1-A17, wherein the waste powder has an average particle size of less than 60 micrometers (μm), less than 50 μm, and/or less than 40 μm in diameter.

A19. The method of any of paragraphs A1-A18, further comprising deflecting an electron beam via an electromagnetic field, thereby selectively fusing portions of an/the initial layer of the waste powder by raising the actual temperature of portions of the initial layer of the waste powder to above a melting point of the waste powder, wherein the selectively fusing the portions of the initial layer of the waste powder is performed after the pre-heating the build chamber to the predetermined preheated temperature.

A20. The method of any of paragraphs A1-A19, further comprising:

lowering the build plate;

spreading a subsequent layer of the waste powder across a build area such that the subsequent layer of the waste powder at least partially overlaps a previous layer of the waste powder; and selectively fusing portions of the subsequent layer of the waste powder to the previous layer of the waste powder by heating the portions of the subsequent layer above the melting point of the waste powder.

A21. The method of paragraph A20, further comprising repeating the lowering the build plate, the spreading the subsequent layer of the waste powder, and the selectively fusing portions of the subsequent layer a plurality of times, until a resulting additively manufactured part is completed.

A22. The method of any of paragraphs A1-A21, further comprising removing excess material from internal channels and/or around a/the resulting additively manufactured part.

A23. The method of any of paragraphs A1-A22, further comprising:

performing laser beam powder bed fusion to create an object; and reserving the waste powder left over from the performing laser beam powder bed fusion to use in EB-PBF additive manufacturing.

A24. The method of any of paragraphs A1-A23, wherein the pre-heating the build chamber to the predetermined preheated temperature takes at least 45 minutes, at least 50 minutes, at least 55 minutes, at least 60 minutes, at least 65 minutes, at least 70 minutes, at least 75 minutes, at least 80 minutes, at least 85 minutes, at least 90 minutes, at least 95 minutes, at least 100 minutes, and/or at most 120 minutes.

A25. The method of any of paragraphs A1-A24, wherein the exposing the build plate to the plurality of streams of electrons is performed for at least 1 minute, at least 2 minutes, at least 3 minutes, at least 4 minutes, at least 5 minutes, at least 10 minutes, at least 15 minutes, at least 20 minutes, and/or at most 30 minutes for each respective stream of electrons of the plurality of streams of electrons.

A26. The method of any of paragraphs A1-A25, wherein the exposing the build plate to the plurality of streams of electrons is performed for different respective amounts of time for each respective stream of electrons of the plurality of streams of electrons.

A27. The method of any of paragraphs A1-A26 wherein each subsequent predetermined interim temperature of the plurality of predetermined interim temperatures is greater than each previous predetermined interim temperature of the plurality of predetermined interim temperatures by at least 30 degrees Celsius (° C.), at least 40° C., at least 50° C., at least 60° C., at least 70° C., at least 80° C., at least 90° C., at least 100° C., at least 110° C., at least 120° C., at least 130° C., at least 140° C., at least 150° C., and/or at most 200° C.

A28. The method of any of paragraphs A1-A27 wherein each respective subsequent predetermined interim temperature of the plurality of predetermined interim temperatures is greater than each respective previous predetermined interim temperature of the plurality of predetermined interim temperatures by a different respective amount.

A29. The method of any of paragraphs A1-A28, wherein the pre-heating the build chamber to the predetermined preheated temperature has an overall rate of temperature increase of between 6-8° C. per minute.

A30. The method of any of paragraphs A1-A29, wherein the pre-heating the build chamber to the predetermined preheated temperature has an overall rate of temperature increase of less than 20° C. per minute (° C./min), less than 15° C./min, less than 10° C./min, and/or less than 5° C./min.

B1. A method of performing electron beam powder bed fusion (EB-PBF) additive manufacturing, comprising:

pre-heating a build chamber of an EB-PBF machine to a predetermined preheated temperature, wherein the pre-heating the build chamber comprises:

exposing a build plate within the build chamber to a first stream of electrons at a first current for a first time period sufficient to pre-heat the build chamber to a predetermined first interim temperature, wherein the build plate is surrounded by waste powder that is leftover and obtained from a laser beam powder bed fusion system;

monitoring an actual temperature of the build chamber to determine when the actual temperature of the build chamber reaches the predetermined first interim temperature; and exposing the build plate to a second stream of electrons once the actual temperature of the build chamber reaches the predetermined first interim temperature, wherein the second stream of electrons has a second current that is greater than the first current, wherein the build plate is exposed to the second stream of electrons for a second time period sufficient to pre-heat the build plate to a predetermined second interim temperature, wherein the predetermined second interim temperature is greater than the predetermined first interim temperature and less than the predetermined preheated temperature.

B2. The method of paragraph B1, further comprising at least partially filling a build tank of a/the EB-PBF machine with the waste powder obtained from the laser beam powder bed fusion system.

B3. The method of paragraph B1 or B2, further comprising:

continuing to monitor the actual temperature of the build chamber; and increasing a current level of electron output by the EB-PBF machine each time the build chamber reaches a subsequent predetermined interim temperature, until the build chamber reaches the predetermined preheated temperature.

B4. The method of any of paragraphs B1-B2, further comprising determining a plurality of predetermined interim temperatures ranging from an ambient, resting temperature of the build chamber to the predetermined preheated temperature, wherein each subsequent predetermined interim temperature of the plurality of predetermined interim temperatures is greater than each previous predetermined interim temperature of the plurality of predetermined interim temperatures.

B5. The method of any of paragraphs B1-B4, further comprising:
monitoring the actual temperature of build chamber to determine when the actual temperature build chamber reaches the predetermined second interim temperature; and
exposing the build plate to a third stream of electrons once the actual temperature of the build chamber reaches the predetermined second interim temperature, wherein the third stream of electrons has a third current that is greater than the second current, wherein the build plate is exposed to the third stream of electrons for a third time period sufficient to pre-heat the build chamber to a predetermined third interim temperature, wherein the predetermined third interim temperature is greater than the predetermined second interim temperature and less than the predetermined preheated temperature.

B6. The method of paragraph B5, further comprising repeating the monitoring the actual temperature of the build chamber a plurality of times for a/the plurality of predetermined interim temperatures, and repeating the exposing the build plate to a different respective stream of electrons of a/the plurality of streams of electrons each time the actual temperature of the build chamber reaches a subsequent respective interim temperature of the plurality of predetermined interim temperatures, until the actual temperature of the build chamber reaches or exceeds the predetermined preheated temperature.

B7. The method of any of paragraphs B1-B6, wherein the pre-heating the build chamber to the predetermined preheated temperature comprises actively controlling a power input of the EB-PBF machine to deliver stepped increases of electron beam current.

B7.1. The method of any of paragraphs B1-B7, wherein the pre-heating the build chamber to the predetermined preheated temperature comprises manually controlling a/the power input of the EB-PBF machine to deliver stepped increases of electron beam current.

B8. The method of paragraph B7 or B7.1, wherein the actively controlling the power input of the EB-PBF machine comprises modifying one or more machine parameters of the EB-PBF machine each time a respective predetermined interim temperature is reached.

B9. The method of any of paragraphs B1-B8, wherein the pre-heating the build chamber to the predetermined preheated temperature is not pre-programmed.

B9.1. The method of any of paragraphs B1-B8, wherein the pre-heating the build chamber to the predetermined preheated temperature is not based on predetermined time intervals.

B10. The method of any of paragraphs B1-B9.1, wherein the pre-heating the build chamber to the predetermined preheated temperature is sufficiently slow such that a static charge of the waste powder is substantially allowed to dissipate.

B11. The method of any of paragraphs B1-B10, wherein the pre-heating the build chamber to the predetermined preheated temperature is sufficiently slow enough to at least substantially prevent smoking of the waste powder.

B12. The method of any of paragraphs B1-B11, wherein each stream of electrons of a/the plurality of streams of electrons has a respective current that is at least 1 milliamp (mA) lower, at least 2 mA lower, at least 3 mA lower, at least 4 mA lower, at least 5 mA lower, at least 6 mA lower, at least 7 mA lower, at least 8 mA lower, at least 9 mA lower, and/or at least 10 mA lower than each subsequent stream of electrons of the plurality of streams of electrons.

B13. The method of any of paragraphs B1-B12, wherein the first stream of electrons has a current that is at least 1 milliamp (mA) lower, at least 2 mA lower, at least 3 mA lower, at least 4 mA lower, at least 5 mA lower, at least 6 mA lower, at least 7 mA lower, at least 8 mA lower, at least 9 mA lower, and/or at least 10 mA lower than the second stream of electrons.

B14. The method of any of paragraphs B1-B13, wherein each stream of electrons of a/the plurality of streams of electrons has a respective current that is between 5-10 mA higher than each previous stream of electrons of the plurality of streams of electrons.

B15. The method of any of paragraphs B1-B14, wherein the second stream of electrons has a current that is between 5-10 mA higher than the first stream of electrons.

B16. The method of any of paragraphs B1-B15, wherein a/the plurality of streams of electrons comprises at least 3 different streams of electrons, at least 4 different streams of electrons, at least 5 different streams of electrons, at least 6 different streams of electrons, at least 7 different streams of electrons, at least 8 different streams of electrons, at least 9 different streams of electrons, at least 10 different streams of electrons, and/or at most 20 different streams of electrons.

B17. The method of any of paragraphs B1-B16, wherein a/the plurality of streams of electrons comprises at least one stream of electrons having a current below 10 mA.

B18. The method of any of paragraphs B1-B17, wherein the first current of the first stream of electrons is less than 10 mA.

B19. The method of any of paragraphs B1-B18, wherein the first current of the first stream of electrons is less than 5 mA.

B19.1. The method of any of paragraphs B1-B19, wherein the second current of the second stream of electrons is between 5-15 mA.

B20. The method of any of paragraphs B1-B19.1, wherein a/the plurality of streams of electrons comprises at least one stream of electrons having a current below 5 mA.

B21. The method of any of paragraphs B1-B20, wherein the first current of the first stream of electrons is 1 mA or less.

B22. The method of any of paragraphs B1-B21, further comprising determining the predetermined preheated temperature, wherein the predetermined preheated temperature is at least partially dependent on a material composition of the waste powder.

B23. The method of any of paragraphs B1-B22, wherein the waste powder comprises a metallic powder.

B24. The method of any of paragraphs B1-B23, wherein the waste powder comprises a titanium alloy powder.

B25. The method of any of paragraphs B1-B24, wherein the waste powder comprises Ti-6Al-4V powder.

B26. The method of any of paragraphs B1-B25, wherein the waste powder has an average particle size of less than 60 micrometers (μm), less than 50 μm, and/or less than 40 μm in diameter.

B27. The method of any of paragraphs B1-B26, further comprising deflecting an electron beam via an electromagnetic field, thereby selectively fusing portions of an initial layer of the waste powder by raising the actual temperature of the portions of the initial layer of the waste powder to above a melting point of the waste powder, wherein the selectively fusing portions of the initial layer of the waste powder is performed after the pre-heating the build chamber to the predetermined preheated temperature.

B28. The method of any of paragraphs B1-B27, further comprising:
lowering the build plate;
spreading a subsequent layer of the waste powder across a build area; and
selectively fusing portions of the subsequent layer of the waste powder by heating the portions of the subsequent layer above a/the melting point of the waste powder.

B29. The method of paragraph B28, further comprising repeating the lowering the build plate, the spreading the subsequent layer of the waste powder, and the selectively fusing the portions of the subsequent layer a plurality of times, until a resulting additively manufactured part is completed.

B30. The method of any of paragraphs B1-B29, further comprising removing excess material from internal channels and/or around a/the resulting additively manufactured part.

B31. The method of any of paragraphs B1-B30, further comprising:
performing laser beam powder bed fusion to create an object; and
reserving the waste powder left over from the performing laser beam powder bed fusion to use in EB-PBF additive manufacturing.

B32. The method of any of paragraphs B1-B31, wherein the pre-heating the build chamber to the predetermined preheated temperature takes at least 45 minutes, at least 50 minutes, at least 55 minutes, at least 60 minutes, at least 65 minutes, at least 70 minutes, at least 75 minutes, at least 80 minutes, at least 85 minutes, at least 90 minutes, at least 95 minutes, at least 100 minutes, and/or at most 120 minutes.

B33. The method of any of paragraphs B1-B32, wherein the first time period is at least 1 minute, at least 2 minutes, at least 3 minutes, at least 4 minutes, at least 5 minutes, at least 10 minutes, at least 15 minutes, at least 20 minutes, and/or at most 30 minutes.

B34. The method of any of paragraphs B1-B33, wherein the second time period is at least 1 minute, at least 2 minutes, at least 3 minutes, at least 4 minutes, at least 5 minutes, at least 10 minutes, at least 15 minutes, at least 20 minutes, and/or at most 30 minutes.

B35. The method of any of paragraphs B1-B34, wherein the first time period is different than the second time period.

B36. The method of any of paragraphs B1-B35, wherein the predetermined second interim temperature is greater than the predetermined first interim temperature by at least 30 degrees Celsius (° C.), at least 40° C., at least 50° C., at least 60° C., at least 70° C., at least 80° C., at least 90° C., at least 100° C., at least 110° C., at least 120° C., at least 130° C., at least 140° C., at least 150° C., and/or at most 200° C.

B37. The method of any of paragraphs B1-B36, wherein the pre-heating the build chamber to the predetermined preheated temperature has an overall rate of temperature increase of between 6-8° C. per minute.

B38. The method of any of paragraphs B1-B37, wherein the pre-heating the build chamber to the predetermined preheated temperature has an overall rate of temperature increase of less than 20° C. per minute (° C./min), less than 15° C./min, less than 10° C./min, and/or less than 5° C./min.

C1. A part made using the method of any of paragraphs A1-A30 and/or any of paragraphs B1-B37.

D1. The use of the method of any of paragraphs A1-A30 and/or any of paragraphs B1-B37 to additively manufacture a part.

As used herein, the terms "selective" and "selectively," when modifying an action, movement, configuration, or other activity of one or more components or characteristics of an apparatus, mean that the specific action, movement, configuration, or other activity is a direct or indirect result of dynamic processes and/or user manipulation of an aspect of, or one or more components of, the apparatus. The terms "selective" and "selectively" thus may characterize an activity that is a direct or indirect result of user manipulation of an aspect of, or one or more components of, the apparatus, or may characterize a process that occurs automatically, such as via the mechanisms disclosed herein.

As used herein, the terms "adapted" and "configured" mean that the element, component, or other subject matter is designed and/or intended to perform a given function. Thus, the use of the terms "adapted" and "configured" should not be construed to mean that a given element, component, or other subject matter is simply "capable of" performing a given function but that the element, component, and/or other subject matter is specifically selected, created, implemented, utilized, programmed, and/or designed for the purpose of performing the function. It is also within the scope of the present disclosure that elements, components, and/or other recited subject matter that is recited as being adapted to perform a particular function may additionally or alternatively be described as being configured to perform that function, and vice versa. Similarly, subject matter that is recited as being configured to perform a particular function may additionally or alternatively be described as being operative to perform that function.

As used herein, the phrase "at least one," in reference to a list of one or more entities should be understood to mean at least one entity selected from any one or more of the entities in the list of entities, but not necessarily including at least one of each and every entity specifically listed within the list of entities and not excluding any combinations of entities in the list of entities. This definition also allows that entities may optionally be present other than the entities specifically identified within the list of entities to which the phrase "at least one" refers, whether related or unrelated to those entities specifically identified. Thus, as a non-limiting example, "at least one of A and B" (or, equivalently, "at least one of A or B," or, equivalently "at least one of A and/or B") may refer, in one example, to at least one, optionally including more than one, A, with no B present (and optionally including entities other than B); in another example, to at least one, optionally including more than one, B, with no A present (and optionally including entities other than A); in yet another example, to at least one, optionally including more than one, A, and at least one, optionally including more than one, B (and optionally including other entities). In other words, the phrases "at least one," "one or more," and "and/or" are open-ended expressions that are both conjunctive and disjunctive in operation. For example, each of the expressions "at least one of A, B, and C," "at least one of A, B, or C," "one or more of A, B, and C," "one or more of A, B, or C" and "A, B, and/or C" may mean A alone, B alone, C alone, A and B together, A and C together, B and C together, or A, B, and C together, and optionally any of the above in combination with at least one other entity.

As used herein, the phrase "at least substantially," when modifying a degree or relationship, includes not only the recited "substantial" degree or relationship, but also the full extent of the recited degree or relationship. A substantial amount of a recited degree or relationship may include at least 75% of the recited degree or relationship. For example, a first direction that is at least substantially parallel to a second direction includes a first direction that is within an angular deviation of 22.5° relative to the second direction and also includes a first direction that is identical to the second direction. As used herein, smoking of waste powder is at least substantially prevented if it is prevented to an extent sufficient to allow the pre-heating and additive manufacturing process to continue in the EB-PBF machine using the waste powder. Similarly, electric charge of the waste powder is at least substantially dissipated if it is dissipated to an extent sufficient to allow the pre-heating and additive manufacturing process to continue in the EB-PBF machine using the waste powder.

The various disclosed elements of apparatuses and steps of methods disclosed herein are not required to all apparatuses and methods according to the present disclosure, and the present disclosure includes all novel and non-obvious combinations and subcombinations of the various elements and steps disclosed herein. Moreover, one or more of the various elements and steps disclosed herein may define independent inventive subject matter that is separate and apart from the whole of a disclosed apparatus or method. Accordingly, such inventive subject matter is not required to be associated with the specific apparatuses and methods that are expressly disclosed herein, and such inventive subject matter may find utility in apparatuses and/or methods that are not expressly disclosed herein.

As used herein, the phrase, "for example," the phrase, "as an example," and/or simply the term "example," when used with reference to one or more components, features, details, structures, examples, and/or methods according to the present disclosure, are intended to convey that the described component, feature, detail, structure, example, and/or method is an illustrative, non-exclusive example of components, features, details, structures, examples, and/or methods according to the present disclosure. Thus, the described component, feature, detail, structure, example, and/or method is not intended to be limiting, required, or exclusive/exhaustive; and other components, features, details, structures, examples, and/or methods, including structurally and/or functionally similar and/or equivalent components, features, details, structures, examples, and/or methods, are also within the scope of the present disclosure.

The invention claimed is:

1. A method of performing electron beam powder bed fusion (EB-PBF) additive manufacturing, comprising:
   determining a plurality of predetermined interim temperatures ranging from an ambient, resting temperature of a build chamber of an EB-PBF machine to a predetermined preheated temperature, wherein each subsequent predetermined interim temperature of the plurality of predetermined interim temperatures is greater than each previous predetermined interim temperature of the plurality of predetermined interim temperatures; and
   pre-heating the build chamber to the predetermined preheated temperature, wherein the pre-heating the build chamber comprises:
      exposing a build plate within the build chamber to a plurality of streams of electrons, one at a time, wherein the build plate is surrounded by waste powder that is leftover and obtained from a laser beam powder bed fusion system, wherein each stream of electrons of the plurality of streams of electrons has a different respective current, and wherein each stream of electrons of the plurality of streams of electrons is configured to raise an actual temperature of the build chamber;
   monitoring the actual temperature of the build chamber during the exposing the build plate to the plurality of streams of electrons;
   comparing the actual temperature of the build chamber to the plurality of predetermined interim temperatures; and
   increasing a power input of the EB-PBF machine a plurality of times, thereby exposing the build plate to a subsequent stream of electrons of the plurality of streams of electrons, wherein the subsequent stream of electrons has a greater current level than a previous stream of electrons of the plurality of streams of electrons, and wherein the increasing the power input is performed each time the actual temperature of the build chamber reaches a respective subsequent predetermined interim temperature of the plurality of predetermined interim temperatures, as determined during the comparing the actual temperature to the plurality of predetermined interim temperatures.

2. The method according to claim 1, wherein the pre-heating the build chamber to the predetermined preheated temperature comprises actively controlling the power input of the EB-PBF machine to deliver stepped increases of electron beam current.

3. The method according to claim 1, wherein the pre-heating the build chamber to the predetermined preheated temperature is sufficiently slow such that a static charge of the waste powder is substantially allowed to dissipate, thereby at least substantially preventing smoking of the waste powder.

4. The method according to claim 1, wherein the plurality of streams of electrons comprises at least seven different streams of electrons and at most twenty different streams of electrons.

5. The method according to claim 1, wherein the plurality of streams of electrons comprises at least one stream of electrons having a current below 5 milliamp (mA).

6. The method according to claim 1, wherein the waste powder comprises a titanium alloy powder.

7. The method according to claim 1, wherein the waste powder has an average particle size of less than 60 micrometers (µm).

8. The method according to claim 1, further comprising deflecting an electron beam via an electromagnetic field, thereby selectively fusing portions of an initial layer of the waste powder by raising the actual temperature of the portions of the initial layer of the waste powder to above a melting point of the waste powder, wherein the selectively fusing portions of the initial layer of the waste powder is performed after the pre-heating the build chamber to the predetermined preheated temperature.

9. The method according to claim 8, further comprising:
   lowering the build plate;
   spreading a subsequent layer of the waste powder across a build area;
   selectively fusing portions of the subsequent layer of the waste powder by heating portions of the subsequent layer above the melting point of the waste powder; and repeating the lowering the build plate, the spreading the subsequent layer of the waste powder, and the selectively fusing portions of the subsequent layer a plurality of times, until a resulting additively manufactured part is completed.

10. The method according to claim 1, further comprising:
performing laser beam powder bed fusion to create an object; and
reserving the waste powder left over from the performing laser beam powder bed fusion to use in EB-PBF additive manufacturing.

11. The method according to claim 1, wherein the pre-heating the build chamber to the predetermined preheated temperature takes at least 60 minutes and at most 120 minutes.

12. The method according to claim 1, wherein the pre-heating the build chamber to the predetermined preheated temperature has an overall rate of temperature increase of between 6-8 degrees Celsius (° C.) per minute.

13. A method of performing electron beam powder bed fusion (EB-PBF) additive manufacturing, comprising:
pre-heating a build chamber to a predetermined preheated temperature, wherein the pre-heating the build chamber comprises:
exposing a build plate within the build chamber to a first stream of electrons at a first current for a first time period sufficient to pre-heat the build chamber to a predetermined first interim temperature, wherein the build plate is surrounded by waste powder that is leftover and obtained from a laser beam powder bed fusion system;
monitoring an actual temperature of the build chamber to determine when the actual temperature of the build chamber reaches the predetermined first interim temperature; and
exposing the build plate to a second stream of electrons once the actual temperature of the build chamber reaches the predetermined first interim temperature, wherein the second stream of electrons has a second current that is greater than the first current, wherein the build plate is exposed to the second stream of electrons for a second time period sufficient to pre-heat the build plate to a predetermined second interim temperature, wherein the predetermined second interim temperature is greater than the predetermined first interim temperature and less than the predetermined preheated temperature.

14. The method according to claim 13, further comprising determining a plurality of predetermined interim temperatures ranging from an ambient, resting temperature of the build chamber to the predetermined preheated temperature, wherein each subsequent predetermined interim temperature of the plurality of predetermined interim temperatures is greater than each previous predetermined interim temperature of the plurality of predetermined interim temperatures, and wherein the plurality of predetermined interim temperatures comprises the predetermined first interim temperature and the predetermined second interim temperature.

15. The method according to claim 14, further comprising:
monitoring the actual temperature of the build chamber to determine when the actual temperature of the build chamber reaches the predetermined second interim temperature; and
exposing the build plate to a third stream of electrons once the actual temperature of the build chamber reaches the predetermined second interim temperature, wherein the third stream of electrons has a third current that is greater than the second current, wherein the build plate is exposed to the third stream of electrons for a third time period sufficient to pre-heat the build chamber to a predetermined third interim temperature, wherein the predetermined third interim temperature is greater than the predetermined second interim temperature and less than the predetermined preheated temperature.

16. The method according to claim 15, further comprising repeating the monitoring the actual temperature of the build chamber a plurality of times for the plurality of predetermined interim temperatures, and repeating the exposing the build plate to a different respective stream of electrons of a plurality of streams of electrons each time the actual temperature of the build chamber reaches a subsequent respective interim temperature of the plurality of predetermined interim temperatures, until the actual temperature of the build chamber reaches or exceeds the predetermined preheated temperature.

17. The method according to claim 13, wherein the predetermined first interim temperature is 50° C. or lower, wherein the predetermined second interim temperature is 100° C. or lower, wherein a plurality of predetermined interim temperatures comprises a predetermined third interim temperature that is 200° C. or lower, a predetermined fourth interim temperature that is 250° C. or lower, a predetermined fifth interim temperature that is 400° C. or lower, a predetermined sixth interim temperature that is 550° C. or lower, a predetermined seventh interim temperature that is 650° C. or lower, and a predetermined eighth interim temperature that is 750° C. or lower.

18. The method according to claim 13, wherein the first current of the first stream of electrons is less than 5 mA, and wherein the second current of the second stream of electrons is between 5-15 mA.

19. The method according to claim 13, wherein the waste powder comprises a titanium alloy powder that has an average particle size of less than 60 µm.

20. A part made using the method of claim 13.

* * * * *